(12) United States Patent
Kim

(10) Patent No.: US 12,639,783 B2
(45) Date of Patent: May 26, 2026

(54) IMAGE PROCESSING DEVICE AND METHOD USING VIDEO AREA SPLITTING, AND ELECTRONIC SYSTEM INCLUDING THE SAME

(71) Applicant: Samsung Electronics Co., Ltd., Suwon-si (KR)

(72) Inventor: Kiman Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 18/446,927

(22) Filed: Aug. 9, 2023

(65) Prior Publication Data

US 2024/0161229 A1 May 16, 2024

(30) Foreign Application Priority Data

Nov. 11, 2022 (KR) ........................ 10-2022-0150257

(51) Int. Cl.
*G06T 7/13* (2017.01)
*G06T 3/40* (2006.01)
*H04N 7/01* (2006.01)

(52) U.S. Cl.
CPC .................. *G06T 3/40* (2013.01); *G06T 7/13* (2017.01); *H04N 7/0127* (2013.01); *G06T 2207/10016* (2013.01); *G06T 2207/20021* (2013.01); *G06T 2207/20132* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,649,537 B2 * | 1/2010 | Campbell | G06F 15/16 |
| | | | 345/506 |
| 9,571,845 B2 | 2/2017 | Lee et al. | |
| 9,658,815 B2 | 5/2017 | Tsuchida et al. | |
| 9,749,646 B2 * | 8/2017 | Zhu | H04N 19/51 |

(Continued)

OTHER PUBLICATIONS

Yung et al. ("Fast and Parallel Video Encoding by Worload Balancing", SMC'98 Conference Proceedings. 1998 IEEE International Conference on Systems, Man, and Cybernetics (Cat. No. 98CH36218) ) (Year: 1998).*

*Primary Examiner* — Randolph I Chu
(74) *Attorney, Agent, or Firm* — Harness, Dickey & Pierce, P.L.C.

(57) ABSTRACT

An image processing device includes a memory configured to store instruction thereon; and a processing circuitry configured to execute the instructions. The processing circuitry is configured to execute the instructions to cause the image processing device to divide input video data into a plurality of input video sub-data corresponding to a plurality of sub-areas, generate a plurality of output video sub-data by performing image processing operations on the plurality of input video sub-data, respectively, generate output video data corresponding to the input video data by merging the plurality of output video sub-data. Each of the plurality of input video sub-data includes main input sub-data corresponding to a respective sub-area among the plurality of sub-areas, and boundary input sub-data corresponding to a portion of an adjacent sub-area adjacent to the respective sub-area among the plurality of sub-areas.

18 Claims, 33 Drawing Sheets

(56)        References Cited

U.S. PATENT DOCUMENTS

| | | | |
|---|---|---|---|
| 10,460,646 B2 | 10/2019 | Arai | |
| 10,701,378 B2 * | 6/2020 | Ryu | H04N 19/119 |
| 11,025,923 B2 * | 6/2021 | Li | H04N 19/176 |
| 12,256,066 B2 * | 3/2025 | Moon | H04N 19/119 |
| 2012/0062552 A1 | 3/2012 | Bae et al. | |
| 2014/0119675 A1 | 5/2014 | Kim et al. | |
| 2021/0029378 A1 * | 1/2021 | He | H04N 19/176 |
| 2023/0336784 A1 * | 10/2023 | Esenlik | H04N 19/167 |
| 2024/0040134 A1 * | 2/2024 | Jhu | H04N 19/70 |
| 2024/0397057 A1 * | 11/2024 | Kang | G06N 3/0464 |
| 2025/0240433 A1 * | 7/2025 | Ma | H04N 19/11 |
| 2025/0280135 A1 * | 9/2025 | Kalva | H04N 19/184 |

* cited by examiner

F I G. 1
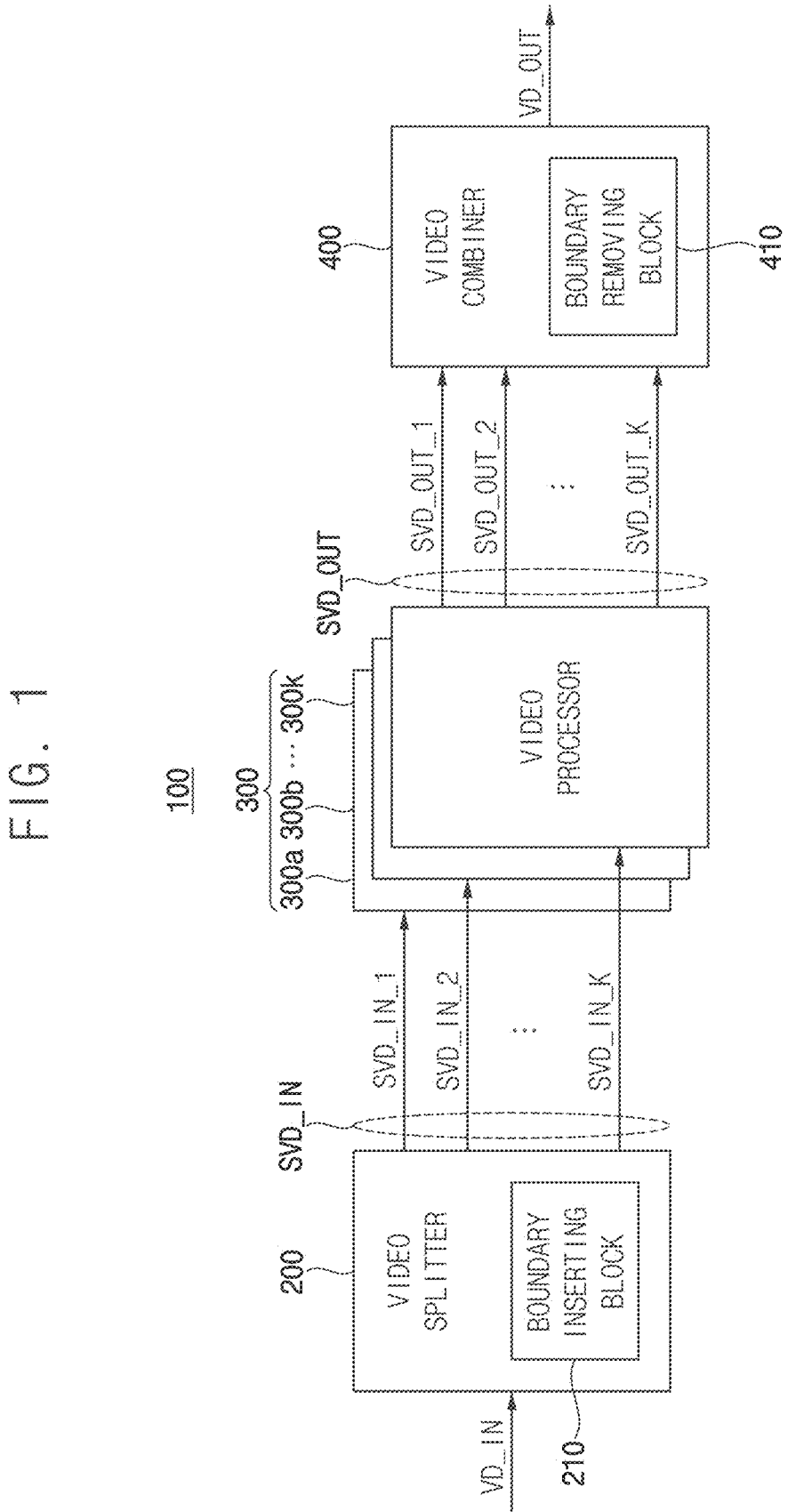

310

<INPUT>                    <OUTPUT>

IMG_INa

IMG_OUTa

VIMG_INa:

VIMG_OUTa:

Figure 12:
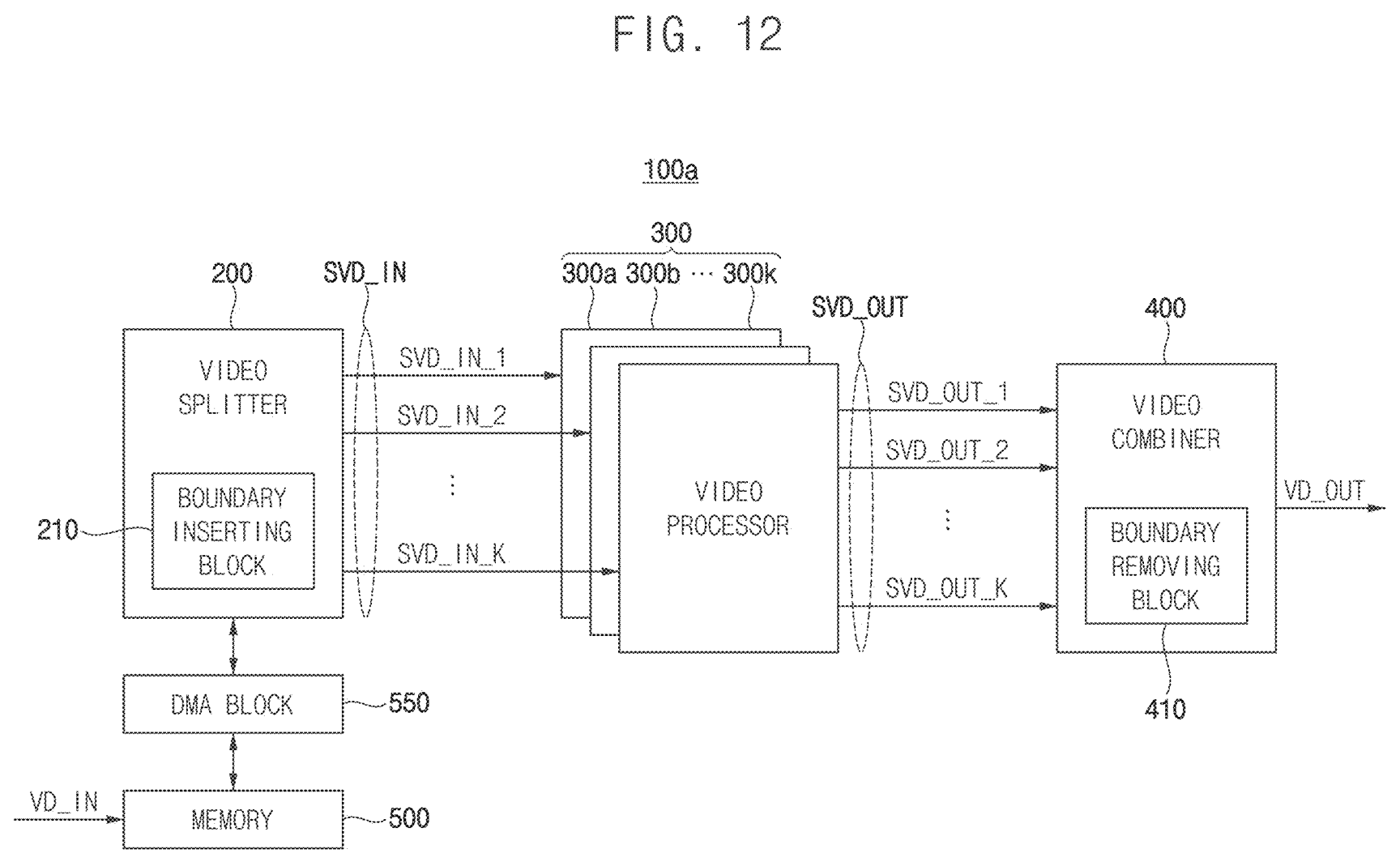

VIDEO
PROCESSOR

400

VIDEO
COMBINER

BOUNDARY
REMOVING
BLOCK

410

SVD_OUT

SVD_OUT_1
SVD_OUT_2
:
SVD_OUT_K

VD_OUT

SVD_IN

SVD_IN_1
SVD_IN_2
:
SVD_IN_K

200

VIDEO
SPLITTER

BOUNDARY
INSERTING
BLOCK

210

550

DMA BLOCK

500

MEMORY

IMG_OUT_SA1

SA1

IMG_OUT_SA2

SA2

IMG_OUT_SA3

SA3

IMG_OUT_SA1

SA1

IMG_OUT_SA2

SA2

SA4          IMG_OUT_SA4

START

DIVIDE INPUT VIDEO DATA INTO A PLURALITY OF INPUT VIDEO SUB-DATA ~S100

GENERATE A PLURALITY OF OUTPUT VIDEO SUB-DATA BY PERFORMING IMAGE PROCESSING OPERATIONS ON A PLURALITY OF INPUT VIDEO SUB-DATA ~S200

GENERATE OUTPUT VIDEO DATA BY MERGING A PLURALITY OF OUTPUT VIDEO SUB-DATA ~S300

END

1000

1100

1200

VD_IN → IMAGE PROCESSING DEVICE → VD_OUT → DISPLAY DEVICE

FIG. 21

IMAGE PROCESSING DEVICE AND METHOD USING VIDEO AREA SPLITTING, AND ELECTRONIC SYSTEM INCLUDING THE SAME

CROSS-REFERENCE TO RELATED APPLICATION

This application claims priority under 35 USC § 119 to Korean Patent Application No. 10-2022-0150257 filed on Nov. 11, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to image processing devices and image processing methods using video area splitting, and electronic systems including the image processing devices.

2. Description of the Related Art

Spurred by the development of electronic technologies, various types of electronic devices have been developed and distributed. For example, image processing devices have been deployed in various places such as homes, offices, and public spaces.

Recently, high resolution display panels, such as a 4K or 8K ultra high definition (UHD) TV, were launched and have been widely distributed. However, the availability of high resolution video content for reproduction on such high resolution display panels is somewhat limited.

SUMMARY

At least one example embodiment of the present disclosure provides an image processing device and an image processing method capable of efficiently processing high resolution or high image quality video data using video area splitting.

At least one example embodiment of the present disclosure provides an electronic system including the image processing device.

According to example embodiments, an image processing device includes a memory configured to store instruction thereon; and a processing circuitry configured to execute the instructions. The processing circuitry is configured to execute the instructions to cause the image processing device to divide input video data into a plurality of input video sub-data corresponding to a plurality of sub-areas of the input video data, generate a plurality of output video sub-data by performing image processing operations on the plurality of input video sub-data, respectively, and generate output video data corresponding to the input video data by merging the plurality of output video sub-data. Each of the plurality of input video sub-data includes main input sub-data corresponding to a respective sub-area among the plurality of sub-areas, and boundary input sub-data corresponding to a portion of an adjacent sub-area adjacent to the respective sub-area among the plurality of sub-areas.

According to example embodiments, an electronic system includes an image processing device and a display device. The image processing device generates output video data based on input video data. The display device displays an image based on the output video data. The image processing device includes a memory configured to store instruction thereon; and a processing circuitry configured to execute the instructions. The processing circuitry is configured to execute the instructions to cause the image processing device to divide the input video data into a plurality of input video sub-data corresponding to a plurality of sub-areas of the input video data, generate a plurality of output video sub-data by performing image processing operations on the plurality of input video sub-data, respectively, and generate the output video by merging the plurality of output video sub-data. Each of the plurality of input video sub-data includes main input sub-data corresponding to a respective sub-area among the plurality of sub-areas, and boundary input sub-data corresponding to a portion of an adjacent sub-area adjacent to the respective sub-area among the plurality of sub-areas.

According to some example embodiments, in an image processing method, input video data is divided into a plurality of input video sub-data corresponding to a plurality of sub-areas of the input video data. A plurality of output video sub-data are generated by performing image processing operations on the plurality of input video sub-data, respectively. Output video data corresponding to the input video data is generated by merging the plurality of output video sub-data. Each of the plurality of input video sub-data includes main input sub-data corresponding to a respective sub-area among the plurality of sub-areas, and boundary input sub-data corresponding to a portion of an adjacent sub-area adjacent to the respective sub-area among the plurality of sub-areas.

According to some example embodiments, an image processing device includes a memory, and processing circuitry. The memory receives input video data from an external device and stores the input video data and stores instructions thereon. The processing circuitry configured to execute the instructions to cause the image processing device to receive the input video data from the memory by performing a direct memory account (DMA) operation, and divides input video data into first input video sub-data corresponding a first sub-area of the input video data and second input video sub-data corresponding to a second sub-area of the input video data, generate first output video sub-data and second output video sub-data by independently performing scaling operations on the first input video sub-data and the second input video sub-data, respectively, generate output video data corresponding to the input video data by merging the first output video sub-data and the second output video sub-data. The first input video sub-data includes first main input sub-data corresponding to the first sub-area, and first boundary input sub-data corresponding to a portion of the second sub-area adjacent to the first sub-area. The scaling operation on the first input video sub-data is performed on both the first main input sub-data and the first boundary input sub-data. The second input video sub-data includes second main input sub-data corresponding to the second sub-area, and second boundary input sub-data corresponding to a portion of the first sub-area adjacent to the second sub-area. The scaling operation on the second input video sub-data is performed on both the second main input sub-data and the second boundary input sub-data. The first output video sub-data includes first main output sub-data corresponding to the first main input sub-data and first boundary output sub-data corresponding to the first boundary input sub-data. The second output video sub-data includes second main output sub-data corresponding to the second main input sub-data and second boundary output sub-data corresponding to the second boundary input sub-data. The processing circuitry is further configured to execute the instruction to generate the output video data using the first main output sub-data and the second main output sub-data without using the first boundary output sub-data and the second boundary output sub-data.

In the image processing device, the image processing method and the electronic system according to some example embodiments, the input video may be split to correspond to the plurality of sub-areas, the independent image processing operations may be performed on the split videos using the plurality of video processors, and the output video may be generated by combining the image-processed videos. Accordingly, high throughput may be achieved without increasing the performance of the video processors, and the image processing may be efficiently performed without increasing cost. In addition, the discontinuity at the boundary between the sub-areas may be prevented or hindered using the data related to the boundary together during the image processing, and thus the image processing may be accurately and productively performed.

BRIEF DESCRIPTION OF THE DRAWINGS

Illustrative, non-limiting example embodiments are more clearly understood from the following detailed description taken in conjunction with the accompanying drawings.

FIG. 1 is a block diagram illustrating an image processing device according to some example embodiments.

FIGS. 12 and 13 are block diagrams illustrating an image processing device according to some example embodiments.

4

Figure 17:
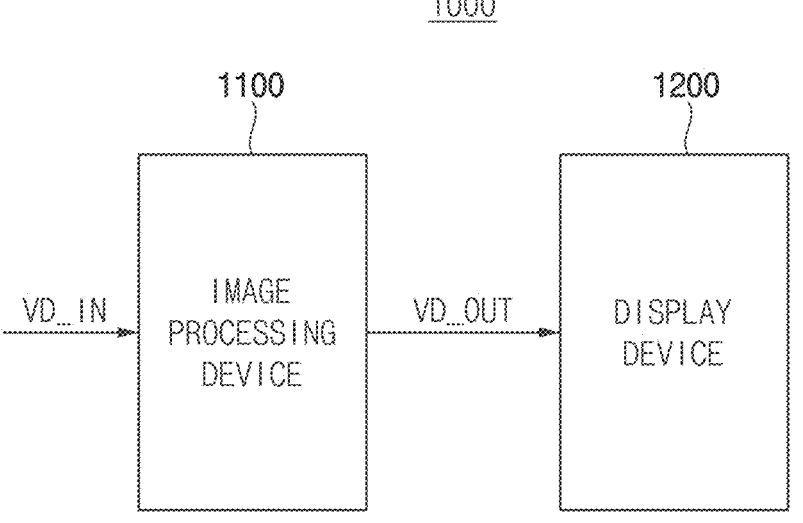
FIG. 17 is a block diagram illustrating an electronic system according to some example embodiments.
Figure 18:
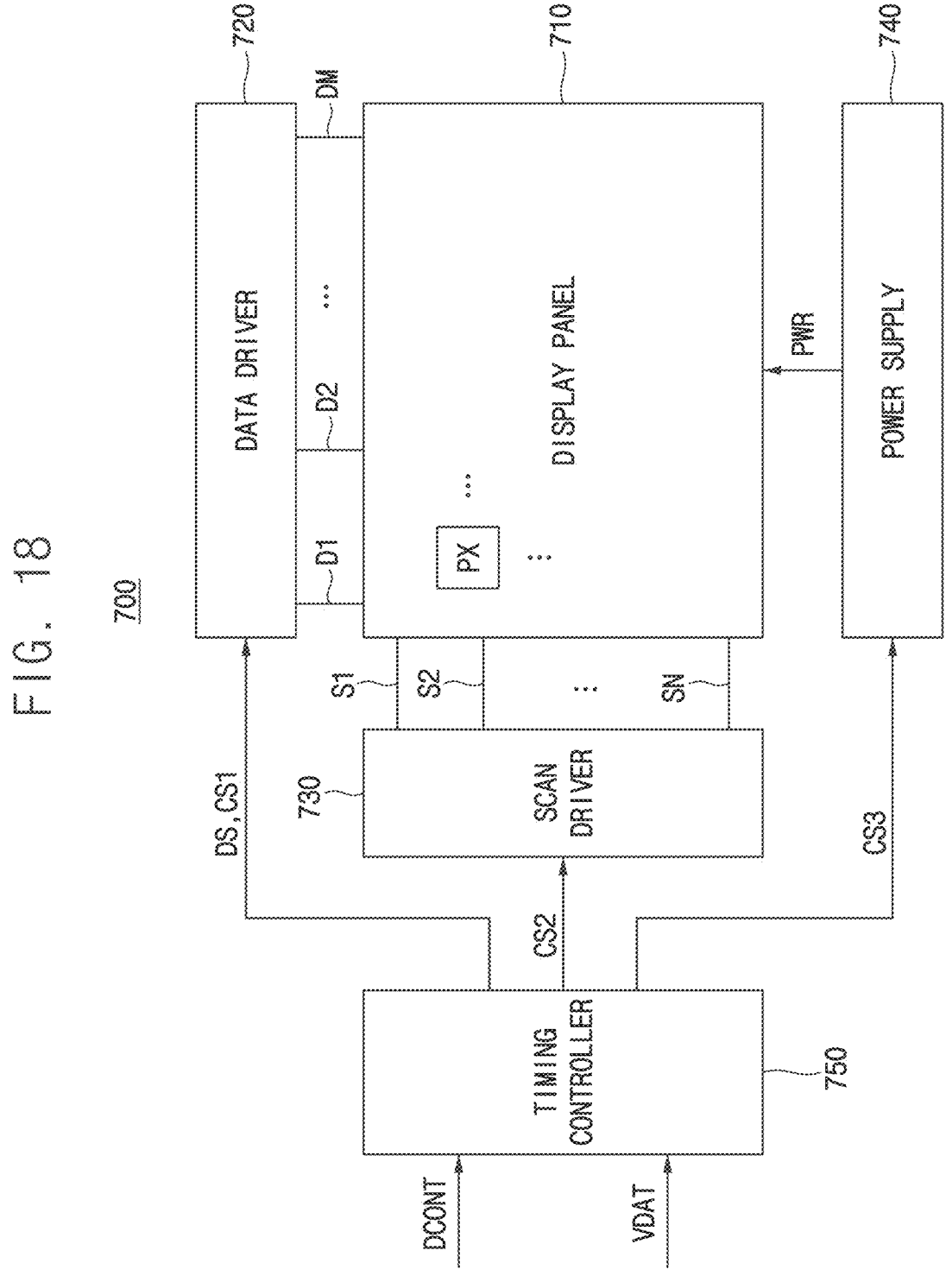

FIG. 18 is a block diagram illustrating an example of a display device included in an electronic system of FIG. 17.

Figure 19:
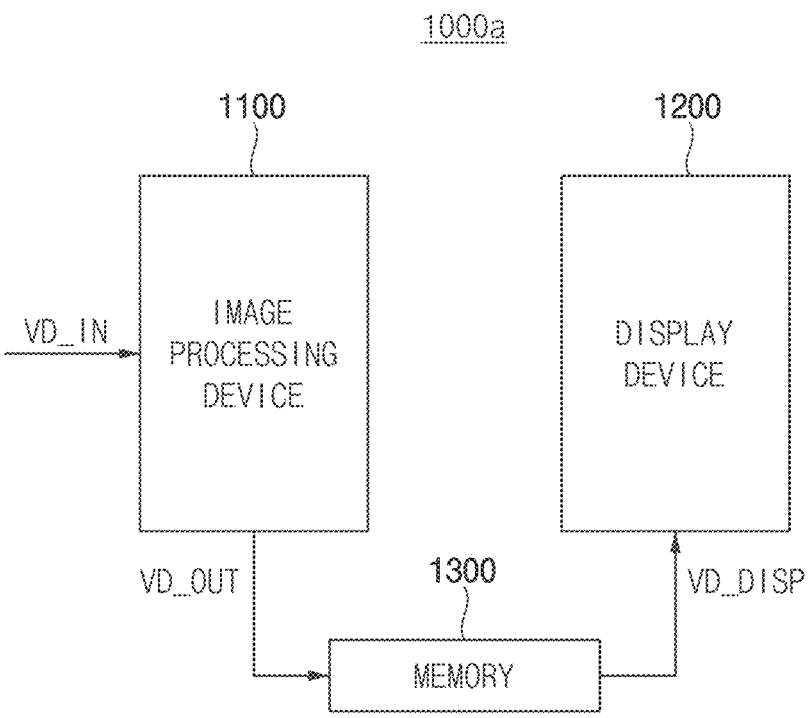

FIG. 19 is a block diagram illustrating an electronic system according to some example embodiments.

Figure 20:
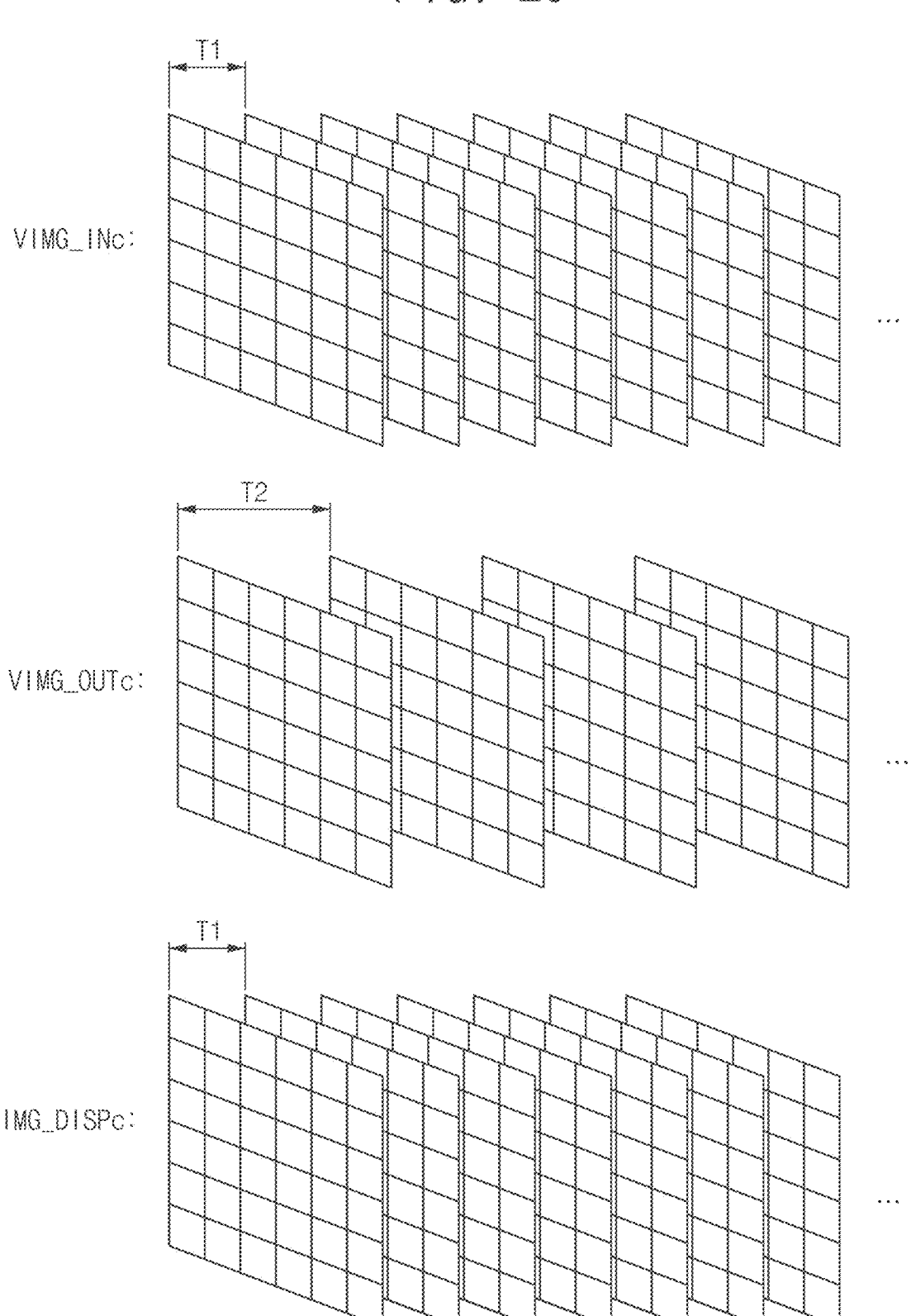

FIG. 20 is a diagram for describing an operation of an electronic system of FIG. 19.

Figure 21:
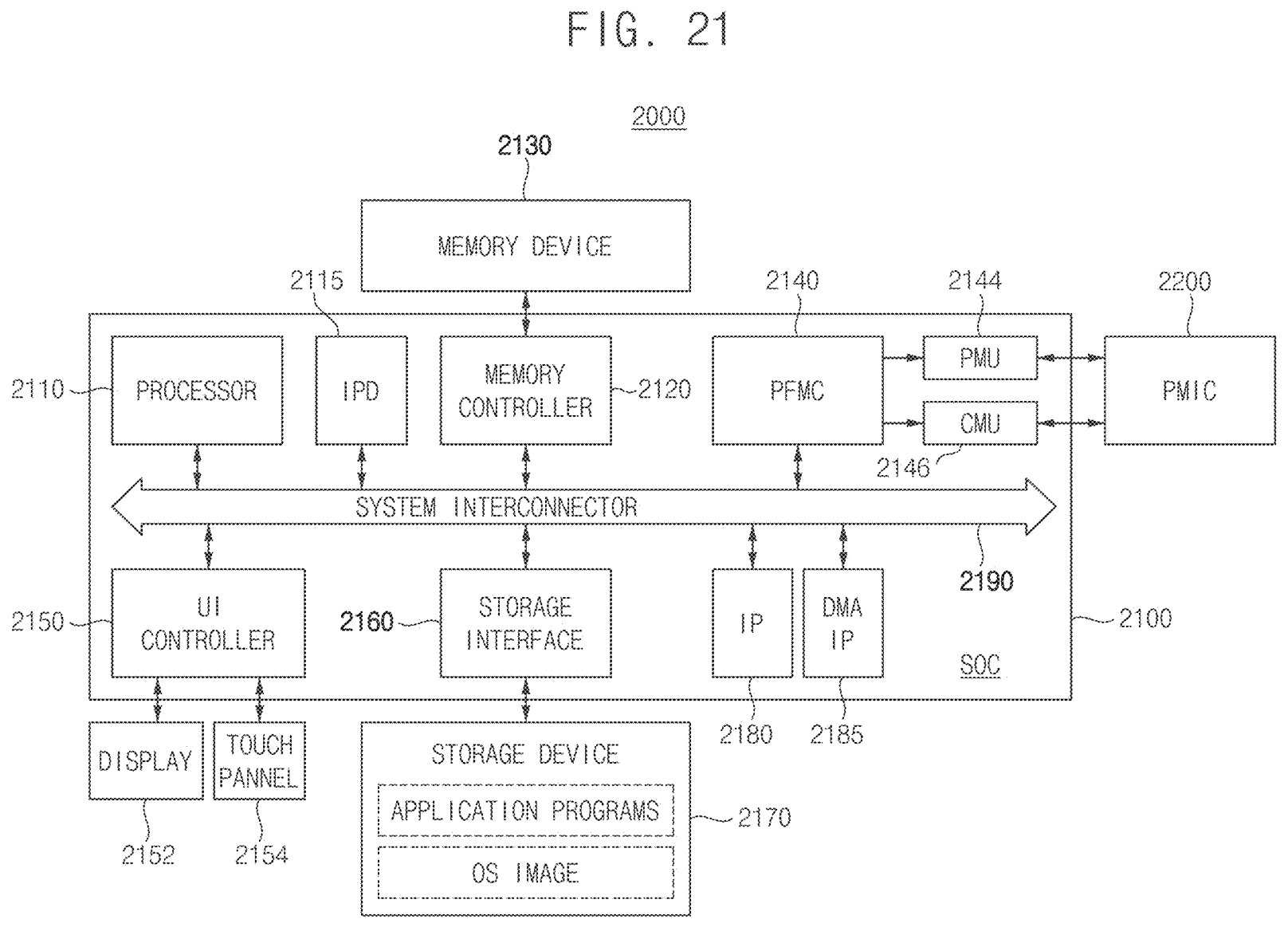

FIG. 21 is a block diagram illustrating an electronic system according to some example embodiments.

Figure 22:
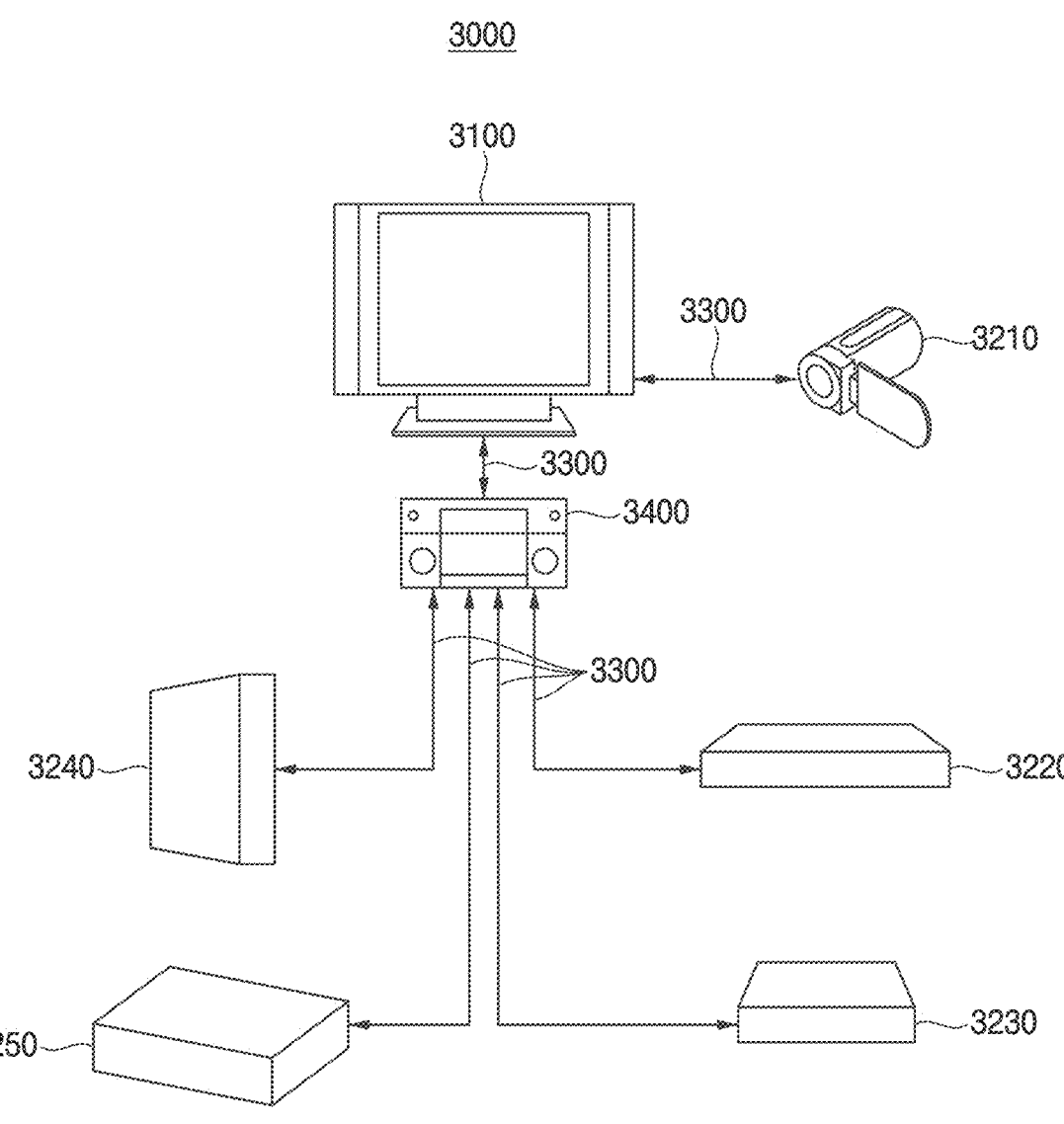

FIG. 22 is a diagram illustrating a digital system according to some example embodiments.

DETAILED DESCRIPTION OF THE EXAMPLE EMBODIMENTS

Various example embodiments are described more fully with reference to the accompanying drawings, in which example embodiments are shown. The present disclosure may, however, be embodied in many different forms and should not be construed as limited to the example embodiments set forth herein. Like reference numerals refer to like elements throughout this application.

FIG. 1 is a block diagram illustrating an image processing device according to some example embodiments.

Referring to FIG. 1, an image processing device 100 includes a video splitter 200, a plurality of video processors 300 and a video combiner 400. The image processing device 100 may be referred to as a video processing device or apparatus.

The video splitter 200 receives input video data VD_IN from the outside of the image processing device 100 (e.g., from an external device located outside the image processing device 100), and divides, splits or separates the input video data VD_IN into a plurality of input video sub-data SVD_IN. For example, the plurality of input video sub-data SVD_IN may include the first to K-th input video sub-data SVD_IN_1, SVD_IN_2, . . . , SVD_IN_K, where K is a natural number greater than or equal to two. The plurality of input video sub-data SVD_IN correspond to a plurality of sub-areas (or sub-regions or sub-planes), respectively, that are included in an image and/or a video displayed by the input video data VD_IN. For example, the number of the plurality of sub-areas may be equal to the number of the plurality of input video sub-data SVD_IN. For example, the plurality of sub-areas may include first to K-th sub-areas respectively corresponding to first to K-th of the plurality of input video sub-data SVD_IN. The video splitter 200 may be referred to as a video divider and/or a video separator.

The video splitter 200 may include a boundary inserting block 210. The boundary inserting block 210 may add or insert data related to or associated with boundary area to each of (or alternatively, at least one of) the plurality of input video sub-data SVD_IN, and thus the discontinuous display of boundaries between the plurality of sub-areas by image processing operations may be prevented or hindered.

For example, each of (or alternatively, at least one of) the plurality of input video sub-data SVD_IN may include main input sub-data corresponding to a respective sub-area among the plurality of sub-areas, and boundary input sub-data corresponding to a portion of an adjacent sub-area adjacent to the respective sub-area among the plurality of sub-areas. The boundary inserting block 210 may control to generate each input video sub-data such that each input video sub-data includes respective border boundary sub-data as well as respective main input sub-data. An operation of the boundary inserting block 210 is described with reference to FIGS. 2A and 2B.

The plurality of video processors 300 generate a plurality of output video sub-data SVD_OUT, respectively, by performing image processing operations on the plurality of input video sub-data SVD_IN, respectively. For example, the plurality of output video sub-data SVD_OUT may include first to K-th output video sub-data SVD_OUT_1, SVD_OUT_2, . . . , SVD_OUT_K. As with the plurality of input video sub-data SVD_IN, the plurality of output video sub-data SVD_OUT may also correspond to the plurality of sub-areas, respectively.

For example, the plurality of video processors 300 may include first to K-th video processors 300a, 300b, . . . , 300k respectively corresponding to the first to K-th of the plurality of output video sub-data SVD_OUT. The first to K-th video processors 300a to 300k may independently and/or individually perform the image processing operations. For example, the first video processor 300a may generate the first output video sub-data SVD_OUT_1 by performing the image processing operation on the first input video sub-data SVD_IN_1. For example, the second video processor 300b may generate the second output video sub-data SVD_OUT_2 by performing the image processing operation on the second input video sub-data SVD_IN_2 independently and/or individually from the first video processor 300a. Further, the third to K-th video processors 300 may generate the third to K-th output video sub-data SVD_OUT by respectively performing the image processing operation on the third to K-th input video sub-data SVD_IN.

Each of (or alternatively, at least one of) the plurality of video processors 300 may perform the image processing operation on both the main input sub-data and the boundary input sub-data included in each of (or alternatively, at least one of) the plurality of input video sub-data SVD_IN, and thus the discontinuous display of boundaries between the plurality of sub-areas may be prevented or hindered.

In some example embodiments, the image processing operations may include a scaling operation of changing a resolution of an image, a frame rate controlling operation of changing a frame rate of an image, an encoding operation and a decoding operation of encoding or decoding (e.g., compressing or decompressing) an image, a filtering operation of enhancing detail of an image or removing noise in image, and/or the like. Configurations of the plurality of video processors 300 for the above-described various image processing operations are described with reference to FIGS. 3, 4A, 4B, 4C, 5, 6A, 6B, 7, 8A, 8B, 8C, 9, 10, 11A, 11B and 11C.

The video combiner 400 generates output video data VD_OUT by merging, combining and/or mixing the plurality of output video sub-data SVD_OUT. The output video data VD_OUT corresponds to the input video data VD_IN, and may represent a result of performing the image processing operations on the input video data VD_IN.

The video combiner 400 may include a boundary removing block 410. The boundary removing block 410 may delete or remove the data related the boundary area added to each of (or alternatively, at least one of) the plurality of input video sub-data SVD_IN, and thus the discontinuous display of boundaries between the plurality of sub-areas may be prevented or hindered finally.

For example, each of (or alternatively, at least one of) the plurality of output video sub-data SVD_OUT may include main output sub-data corresponding to the main input sub-data, and boundary output sub-data corresponding to the boundary input sub-data. The boundary removing block 410 may control to generate the output video data VD_OUT using only each main output sub-data such that each boundary output sub-data is removed from each output video sub-data and only each main output sub-data is used by the video combiner 400. An operation of the boundary removing block 410 are described with reference to FIGS. 2D and 2E.

In some example embodiments, at least a part of the video splitter 200, the plurality of video processors 300 and the video combiner 400 may be implemented as hardware. For example, at least a part of the video splitter 200, the plurality of video processors 300 and the video combiner 400 may be included in a computer-based electronic system. In other example embodiments, at least a part of the video splitter 200, the plurality of video processors 300 and the video combiner 400 may be implemented as instruction codes or program routines (e.g., a software program). For example, the instruction codes or the program routines may be executed by a computer-based electronic system, and may be stored in any storage device located inside or outside the computer-based electronic system.

FIGS. 2A, 2B, 2C, 2D and 2E are diagrams for describing an operation of an image processing device according to some example embodiments.

FIGS. 2A, 2B, 2C, 2D and 2E illustrate an example where an image is divided into two sub-areas, e.g., an example where K=2 in FIG. 1.

Figure 2A:
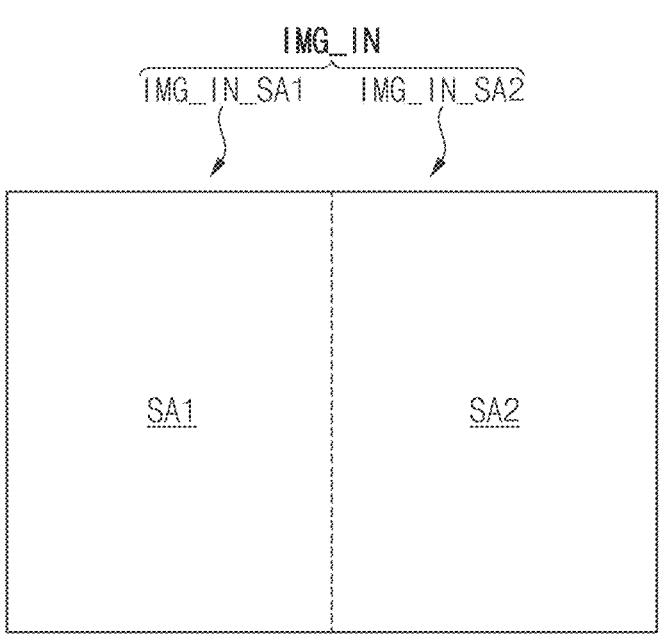
FIGS. 2A, 2B, 2C, 2D and 2E are diagrams for describing an operation of an image processing device according to some example embodiments.

Referring to FIG. 2A, an input image IMG_IN may include a first main input sub-image IMG_IN_SA1 corresponding to a first sub-area SA1, and a second main input sub-image IMG_IN_SA2 corresponding to a second sub-area SA2. A boundary between the first sub-area SA1 and the second sub-area SA2 is illustrated by a dotted line. For example, the input image IMG_IN may correspond to the input video data VD_IN in FIG. 1.

In some example embodiments, when a still image (or stopped image or static image) is displayed based on the input video data VD_IN, the input image IMG_IN may correspond to the still image. In other example embodiments, when a moving image (or video image or dynamic image) is displayed based on the input video data VD_IN, the moving image may include a plurality of frame images, and the input image IMG_IN may correspond to one of the plurality of frame images.

Figure 2B:
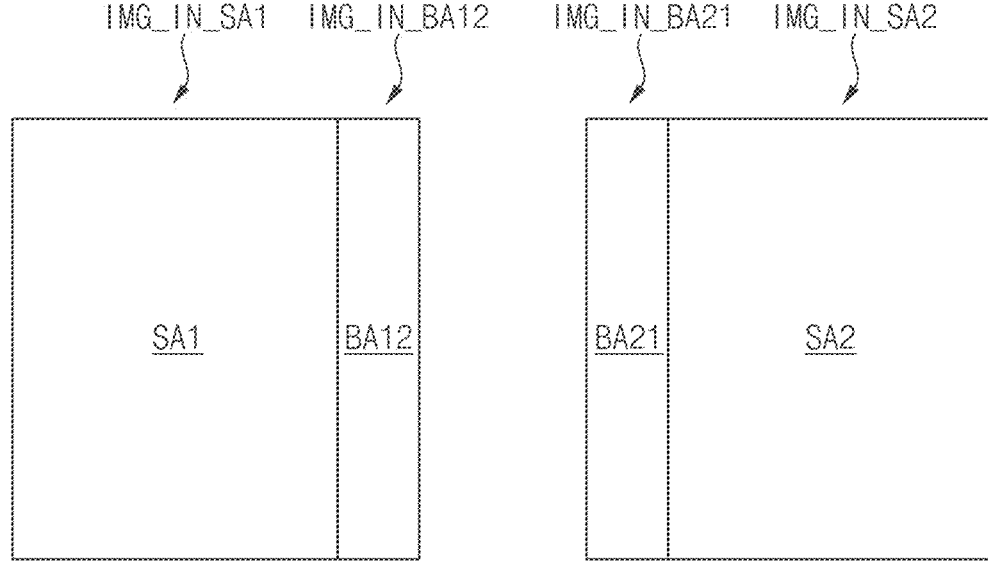

Referring to FIG. 2B, an image splitting operation may be performed by the video splitter 200 in FIG. 1, and the input image IMG_IN may be divided into the first main input sub-image IMG_IN_SA1 and the second main input sub-image IMG_IN_SA2. As described above, while the image splitting operation is performed, data related to the boundary between the first and second sub-areas SA1 and SA2 may be used together with the data related to the first and second sub-areas SA1 and SA2.

For example, a first boundary input sub-image IMG_IN_BA12 corresponding to a first boundary area BA12, which is a portion or part of the second sub-area SA2, may be provided together with the first main input sub-image IMG_IN_SA1 by the boundary inserting block 210. In addition, a second boundary input sub-image IMG_IN_BA21 corresponding to a second boundary area BA21, which is a portion of the first sub-area SA1, may be provided together with the second main input sub-image IMG_IN_SA2 by the boundary inserting block 210. For example, the first boundary area BA12 may be a first portion of the second sub-area SA2 adjacent to the first sub-area SA1, and the second boundary area BA21 may be a first portion of the first sub-area SA1 adjacent to the second sub-area SA2. For example, the first main input sub-image IMG_IN_SA1 and the first boundary input sub-image IMG_IN_BA12 may correspond to first main input sub-data and first boundary input sub-data, respectively, that are included in the first input video sub-data SVD_IN_1 in FIG. 1. For example, the second main input sub-image IMG_IN_SA2 and the second boundary input sub-image IMG_IN_BA21 may correspond to second main input sub-data and second boundary input sub-data, respectively, that are included in the second input video sub-data SVD_IN_2 in FIG. 1.

Figure 2C:
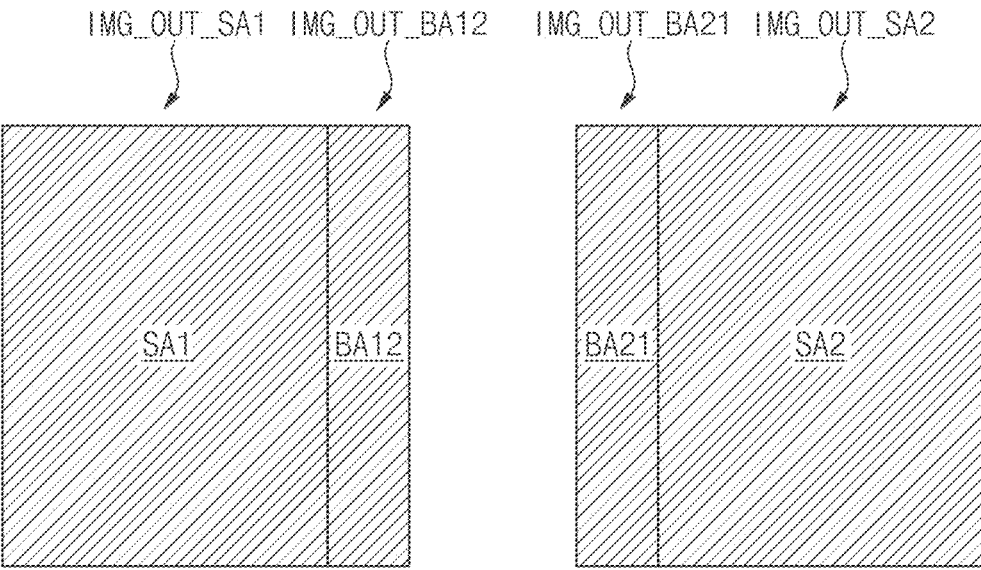

Referring to FIG. 2C, image processing operations may be performed by the plurality of video processors 300 in FIG. 1. As described above, the image processing operations may be performed on both the data related to the sub-areas SA1 and SA2 and the data related to the boundary between the sub-areas SA1 and SA2.

For example, the image processing operation may be performed on both the first main input sub-image IMG_IN_SA1 and the first boundary input sub-image IMG_IN_BA12 by the first video processor 300a, and thus a first main output sub-image IMG_OUT_SA1 corresponding to the first sub-area SA1 and a first boundary output sub-image IMG_OUT_BA12 corresponding to the first boundary area BA12 may be generated. In addition, the image processing operation may be performed on both the second main input sub-image IMG_IN_SA2 and the second boundary input sub-image IMG_IN_BA21 by the second video processor 300b, and thus a second main output sub-image IMG_OUT_SA2 corresponding to the second sub-area SA2 and a second boundary output sub-image IMG_OUT_BA21 corresponding to the second boundary area BA21 may be generated. For example, the first main output sub-image IMG_OUT_SA1 and the first boundary output sub-image IMG_OUT_BA12 may correspond to first main output sub-data and first boundary output sub-data, respectively, that are included in the first output video sub-data SVD_OUT_1 in FIG. 1. For example, the second main output sub-image IMG_OUT_SA2 and the second boundary output sub-image IMG_OUT_BA21 may correspond to second main output sub-data and second boundary output sub-data, respectively, that are included in the second output video sub-data SVD_OUT_2 in FIG. 1.

Figure 2D:
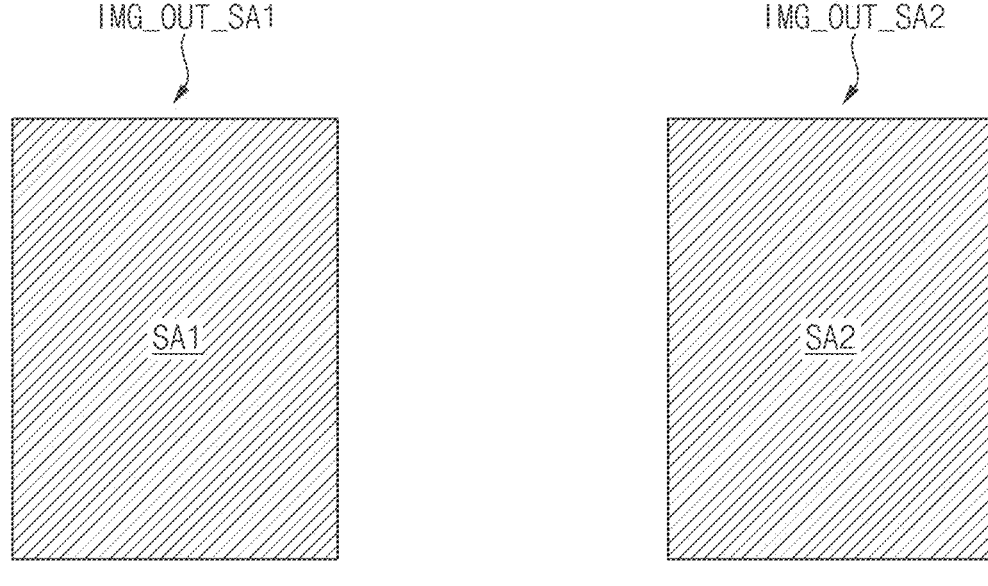
Figure 2E:
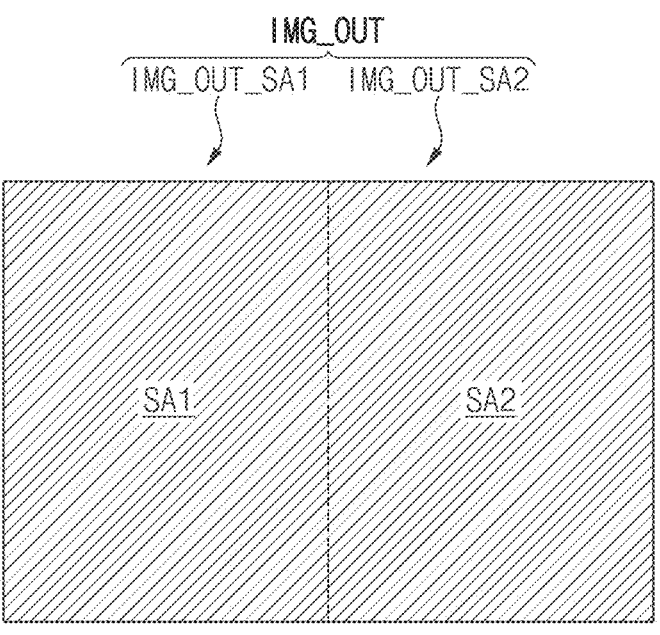

Referring to FIGS. 2D and 2E, an image combining operation may be performed by the video combiner 400 in FIG. 1, and an output image IMG_OUT including the first main output sub-image IMG_OUT_SA1 and the second main output sub-image IMG_OUT_SA2 may be generated. As described above, while the image combining operation is performed, only the data related to the sub-areas SA1 and SA2 may be used without using the data related to the boundary between the sub-areas SA1 and SA2.

For example, as illustrated in FIG. 2D, the first boundary output sub-image IMG_OUT_BA12, which is provided together with the first main output sub-image IMG_OUT_SA1, may be removed by the boundary removing block 410. In addition, the second boundary output sub-image IMG_OUT_BA21, which is provided together with the second main output sub-image IMG_OUT_SA2, may be removed by the boundary removing block 410.

Thereafter, as illustrated in FIG. 2E, the output image IMG_OUT including the first main output sub-image IMG_OUT_SA1 and the second main output sub-image IMG_OUT_SA2 may be generated and output by the video combiner 400. As described above, since the image processing operations are performed using the data related to the boundary between the sub-areas SA1 and SA2 together, the discontinuity may not appear or recognize at the boundary between the first and second sub-areas SA1 and SA2.

In the image processing device 100 according to some example embodiments, the input video may be split to correspond to the plurality of sub-areas, the independent image processing operations may be performed on the split videos using the plurality of video processors 300, and the output video may be generated by combining the image-processed videos. Accordingly, high throughput may be achieved without increasing the performance of the video processors 300, and the image processing may be efficiently performed without increasing cost. In addition, the discontinuity at the boundary between the sub-areas may be prevented or hindered using the data related to the boundary together during the image processing, and thus the image processing may be accurately and productively performed.

Hereinafter, some example embodiments are described in detail based on an example where an image is divided into two sub-areas, e.g., an example where K=2 in FIG. 1.

Figure 3:
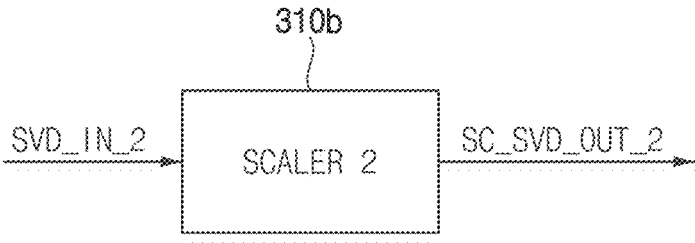
FIG. 3 is a block diagram illustrating an example of a plurality of video processors included in an image processing device of FIG. 1.

FIG. 3 is a block diagram illustrating an example of a plurality of video processors included in an image processing device of FIG. 1.

Referring to FIG. 3, a plurality of video processors 310 may include a plurality of scalers 310a and 310b that perform a scaling operation on the input video data VD_IN. For example, the plurality of scalers 310a and 310b may include a first scaler 310a and a second scaler 310b. The first scaler 310a may generate first output video sub-data SC_SVD_OUT_1, which is scaled video sub-data, by performing the scaling operation on the first input video sub-data SVD_IN_1. The second scaler 310b may generate second output video sub-data SC_SVD_OUT_2, which is scaled video sub-data, by performing the scaling operation on the second input video sub-data SVD_IN_2.

In some example embodiments, the scaling operation may represent an operation of changing a size (including number of pixels and/or dimensions of pixels in the image) and/or resolution of an image. For example, the scaling operation may include an up-scaling operation (or up-sampling operation) of increasing the size and/or resolution of the image, and a down-scaling operation (or down-sampling operation) of decreasing the size and/or resolution of the image.

A size of an image represents to width*height of the image, and a resolution of an image represents the number of pixels and/or pixel data included in the image (or unit area). For example, the resolution of the image is the detail the image holds, and this term applies to digital images, film images, and other types of images. "Higher resolution" means more image detail. The resolution may be measured in various manners, and resolution units may be tied to physical sizes (e.g., lines per mm, lines per inch), to the overall size of a picture (lines per picture height, also known simply as lines, TV lines, or TVL), or to angular subtense. For example, the term resolution may be considered equivalent to pixel count in digital imaging, and may be represented as number of effective pixels, pixels per inch (PPI), and/or the like.

However, example embodiments are not limited thereto, and the scaling operation may represent an operation of changing (e.g., increasing or decreasing) a bit-depth of an image, or an operation of changing at least one of various parameters or factors related to a quality of an image. A bit depth of an image represents the amount of color information that each pixel included in the image may use, e.g., the number of bits of data that each pixel may store.

Figure 4A:
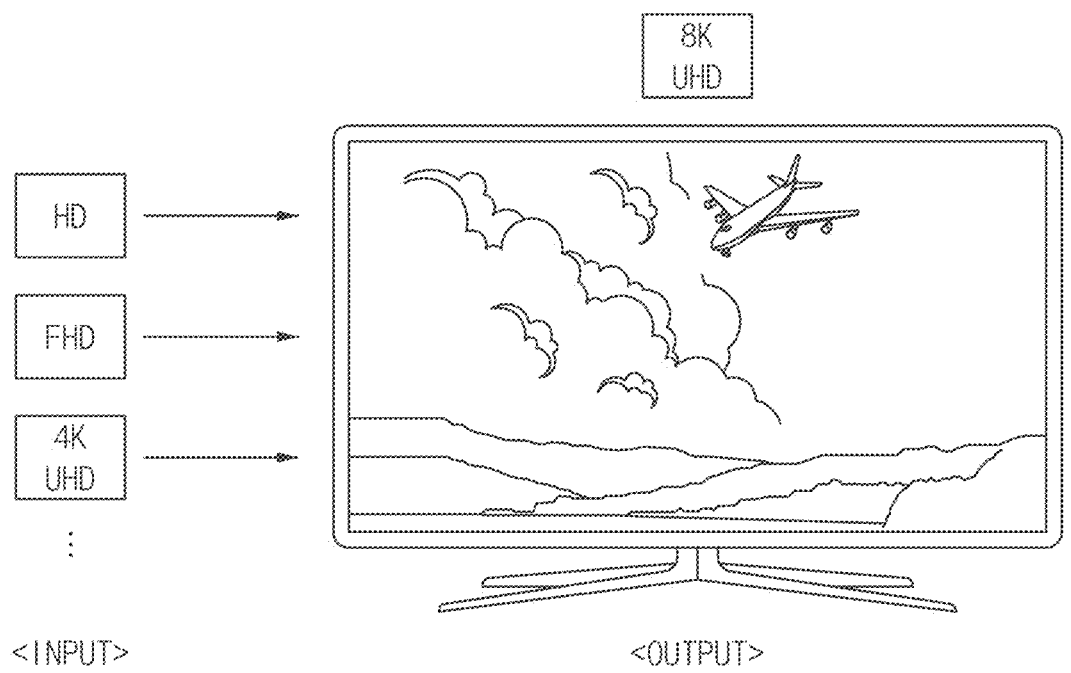
FIGS. 4A, 4B and 4C are diagrams for describing operations of a plurality of video processors of FIG. 3.
Figure 4B:
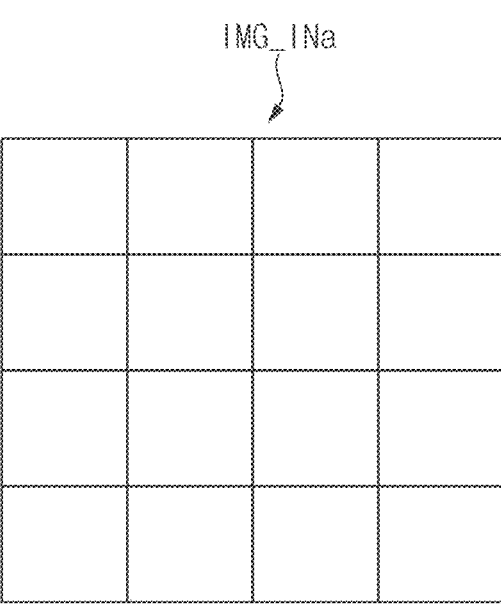
Figure 4C:
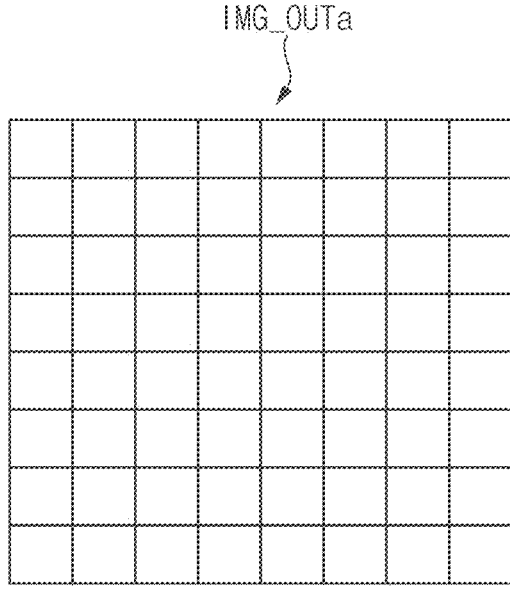

FIGS. 4A, 4B and 4C are diagrams for describing operations of a plurality of video processors of FIG. 3.

Referring to FIG. 4A, an example where the image processing device 100 according to some example embodiments is included in an electronic system such as a digital TV is illustrated.

The image processing device 100 may receive images having various resolutions. For example, the image processing device 100 may receive an image formatted according to any of standard definition (SD), high definition (HD), full HD (FHD), 4K ultra HD (UHD) and 8K UHD images.

The electronic system including the image processing device 100 may be implemented as a digital TV that outputs and/or displays high resolution images. For example, the electronic system may be an 8K UHD TV displaying 8K UHD images.

Even if the electronic system including the image processing device 100 is implemented as an 8K UHD TV, due to limited availability of 8K UHD contents, there are many instances in which images such as SD, HD, FHD and 4K UHD images (hereinafter, referred to as images of a low resolution) are only available. In this case, a method of converting an input image of a low resolution into an 8K UHD image (hereinafter, referred to as an image of a high resolution) may be provided, and the plurality of scalers 310a and 310b in FIG. 3 may be used for such converting operation.

Referring to FIG. 4B, an example of an input image IMG_INa is illustrated. For example, the input image IMG_INa and the input video data VD_IN corresponding to the input image IMG_INa may have a first resolution.

Referring to FIG. 4C, an example of an output image IMG_OUTa that is obtained by performing the scaling operation on the input image IMG_INa is illustrated. For example, the output image IMG_OUTa obtained by performing the scaling operation and the output video data VD_OUT corresponding to the output image IMG_OUTa may have a second resolution different from the first resolution.

For example, the scaling operation may be an up-scaling operation of converting the input image IMG_INa having a low resolution into the output image IMG_OUTa having a high resolution. For example, the second resolution may be higher than the first resolution. For example, the input image IMG_INa having the low resolution may be represented by 4*4=16 pixels, and the output image IMG_OUTa having the high resolution may be represented by 8*8=64 pixels. In FIGS. 4B and 4C and subsequent figures, one small square may correspond to one pixel.

In some example embodiments, the plurality of scalers 310a and 310b may be implemented in various manners to perform the above-described scaling operation. For example, the output image IMG_OUTa may be generated based on the input image IMG_INa using an interpolation operation. For another example, the output image IMG_OUTa may be generated based on the input image IMG_INa using a super-resolution scheme. Alternatively, the output image IMG_OUTa may be generated based on the input image IMG_INa using a machine learning model and/or a neural network model. However, example embodiments are not limited thereto, and various other schemes and/or techniques may be used for the scaling operation.

Figure 5:
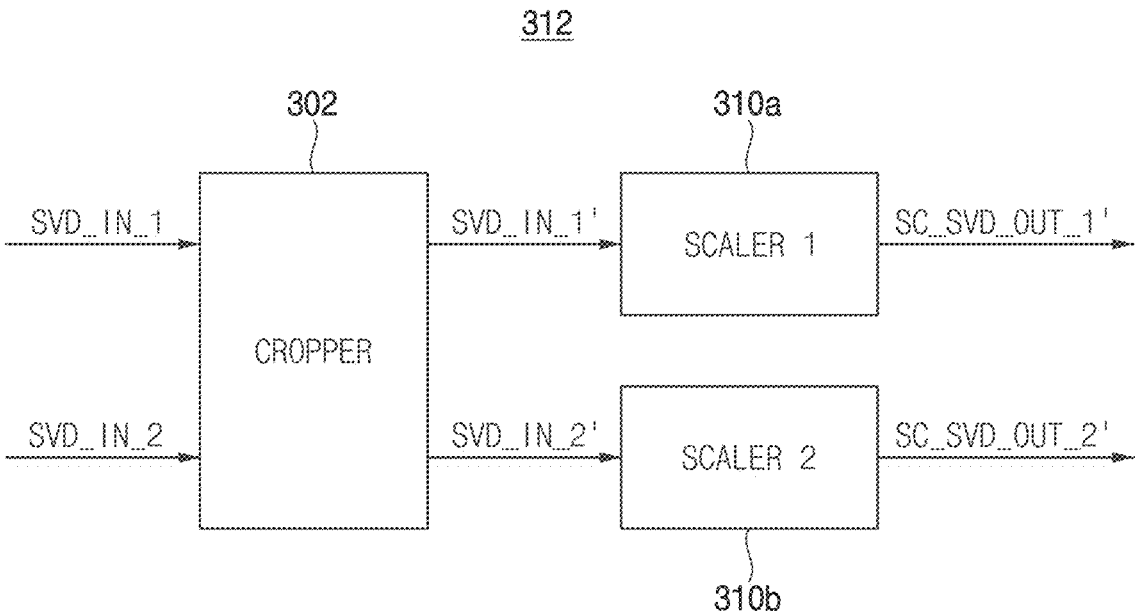
FIG. 5 is a block diagram illustrating an example of a plurality of video processors included in an image processing device of FIG. 1.

FIG. 5 is a block diagram illustrating an example of a plurality of video processors included in an image processing device of FIG. 1. The descriptions repeated with FIG. 3 are omitted for brevity.

Referring to FIG. 5, a plurality of video processors 312 may include a plurality of scalers 310a and 310b, and may further include a cropper 302 that performs a cropping operation on the input video data VD_IN.

The plurality of video processors 312 of FIG. 5 may be substantially the same as the plurality of video processors 310 of FIG. 3, except that the plurality of video processors 312 further include the cropper 302.

The cropper 302 may generate cropped first input video sub-data SVD_IN_1' and cropped second input video sub-data SVD_IN_2' by performing the cropping operation on the first input video sub-data SVD_IN_1 and the second input video sub-data SVD_IN_2. The first scaler 310a may generate cropped first output video sub-data SC_SVD_OUT_1' by performing the scaling operation on the cropped first input video sub-data SVD_IN_1'. The second scaler 310b may generate cropped second output video sub-data SC_SVD_OUT_2' by performing the scaling operation on the cropped second input video sub-data SVD_IN_2".

The term "crop" may be defined as "to trim" or "cut back". For example, the cropping operation may be used to trim off the outside edges of a digital image. For example, the cropping operation may be used to make an image smaller (in pixels) and/or to change the aspect ratio (length to width) of the image. In other words, the cropping operation may represent an operation of improving a picture or video by removing unnecessary parts.

In some example embodiments, the cropper 302 may be included in the video splitter 200 in FIG. 1. In some example embodiments, as are described with reference to FIG. 12, when the input video data VD_IN is received from a memory, only a portion of the input video data VD_IN (e.g., only video data corresponding to the cropped first and second input video sub-data SVD_IN_1' and SVD_IN_2') may be obtained or received using the cropper 302. In other words, the cropping operation may be performed before the image splitting operation.

Figure 6A:
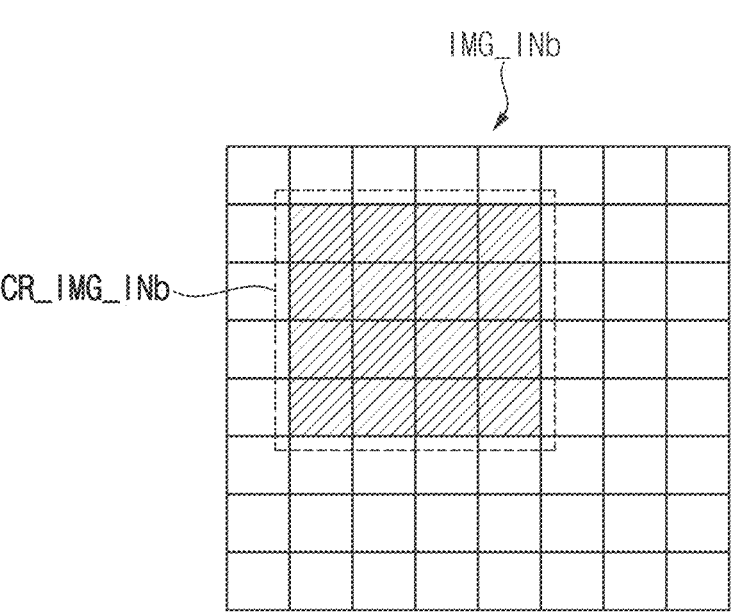
FIGS. 6A and 6B are diagrams for describing operations of a plurality of video processors of FIG. 5.
Figure 6B:
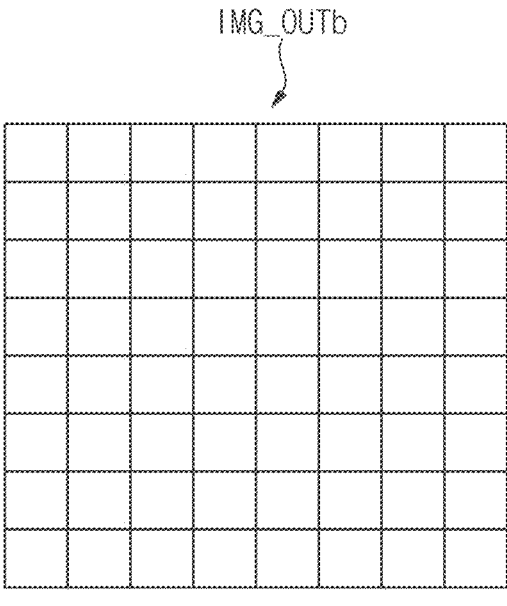

FIGS. 6A and 6B are diagrams for describing operations of a plurality of video processors of FIG. 5.

Referring to FIG. 6A, an example of an input image IMG_INb is illustrated, and an example of a cropped input image CR_IMG_INb that is obtained by performing the cropping operation on the input image IMG_INb is illustrated. For example, the input image IMG_INb and the input video data VD_IN corresponding to the input image IMG_INb may have a first resolution, and the cropped input image CR_IMG_INb obtained by performing the cropping operation may correspond to a portion of the input video data VD_IN (e.g., the cropped first and second output video sub-data SC_SVD_OUT_1' and SC_SVD_OUT_2' in FIG. 5).

Referring to FIG. 6B, an example of an output image IMG_OUTb that is obtained by performing the scaling operation on the cropped input image CR_IMG_INb is illustrated.

For example, the scaling operation may be an up-scaling operation. For example, the cropped input image CR_IMG_INb may have a resolution (e.g., the first resolution) substantially equal to that of the input image IMG_INb, and may have a size smaller than that of the input image IMG_INb. The output image IMG_OUTa obtained by performing the scaling operation and the output video data VD_OUT corresponding to the output image IMG_OUTa may have a resolution (e.g., the first resolution) substantially equal to that of the input image IMG_INb, and may have a size substantially equal to that of the input image IMG_INb.

Figure 7:
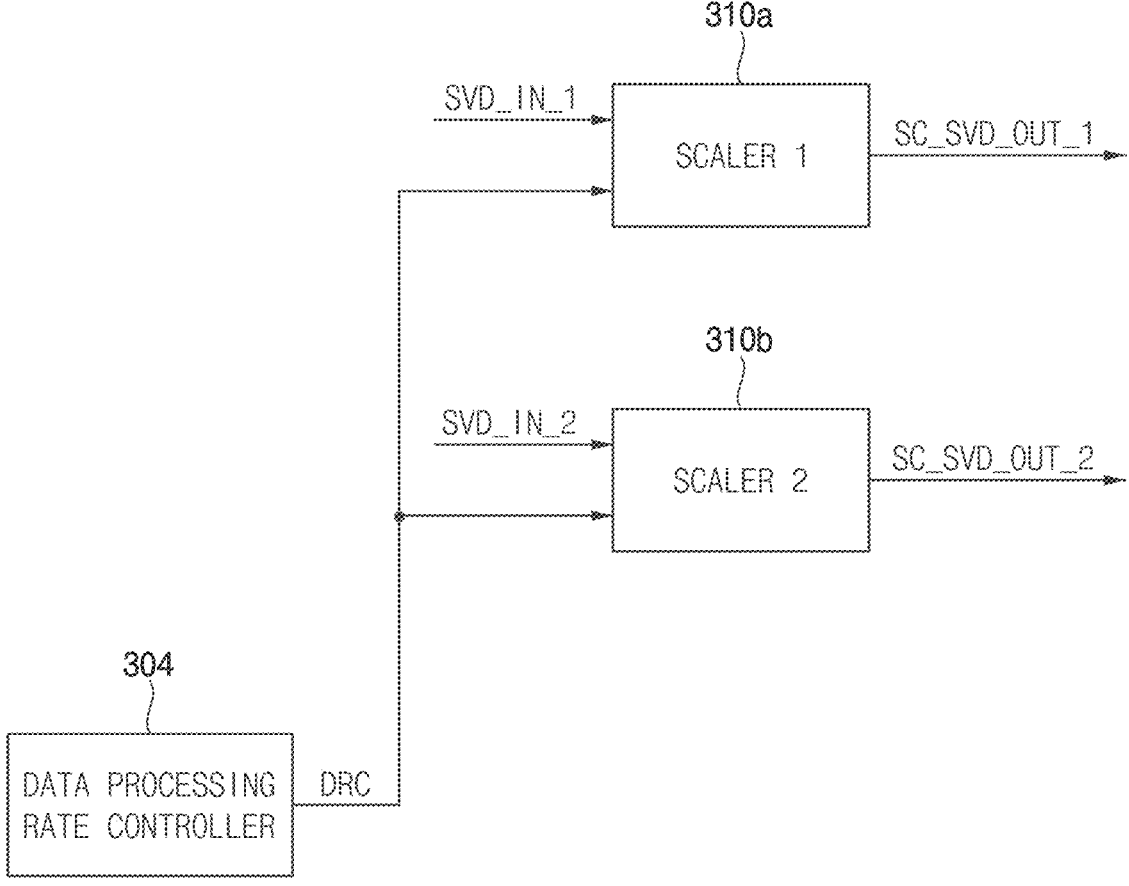
FIG. 7 is a block diagram illustrating an example of a plurality of video processors included in an image processing device of FIG. 1.

FIG. 7 is a block diagram illustrating an example of a plurality of video processors included in an image processing device of FIG. 1. The descriptions repeated with FIG. 3 are omitted for brevity.

Referring to FIG. 7, a plurality of video processors 314 may include a plurality of scalers 310a and 310b, may further include a data processing rate controller 304 that controls a data processing rate related to the scaling operation.

The plurality of video processors 314 of FIG. 7 may be substantially the same as the plurality of video processors 310 of FIG. 3, except that the plurality of video processors 314 further include the data processing rate controller 304.

The data processing rate controller 304 may generate a data processing rate control signal DRC for controlling the data processing rate related to for the scaling operation. The first and second scalers 310a and 310b may control the data processing rate based on the data processing rate control signal DRC. The first scaler 310a may generate the first output video sub-data SC_SVD_OUT_1 by performing the scaling operation on the first input video sub-data SVD_IN_1 according to the controlled data processing rate. The second scaler 310b may generate the second output video sub-data SC_SVD_OUT_2 by performing the scaling operation on the second input video sub-data SVD_IN_2 according to the controlled data processing rate.

Figure 8A:
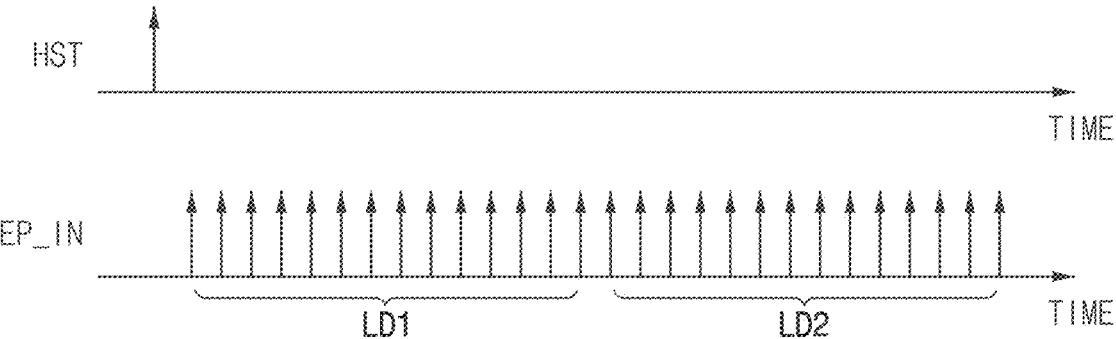
FIGS. 8A, 8B and 8C are diagrams for describing operations of a plurality of video processors of FIG. 7.
Figure 8B:
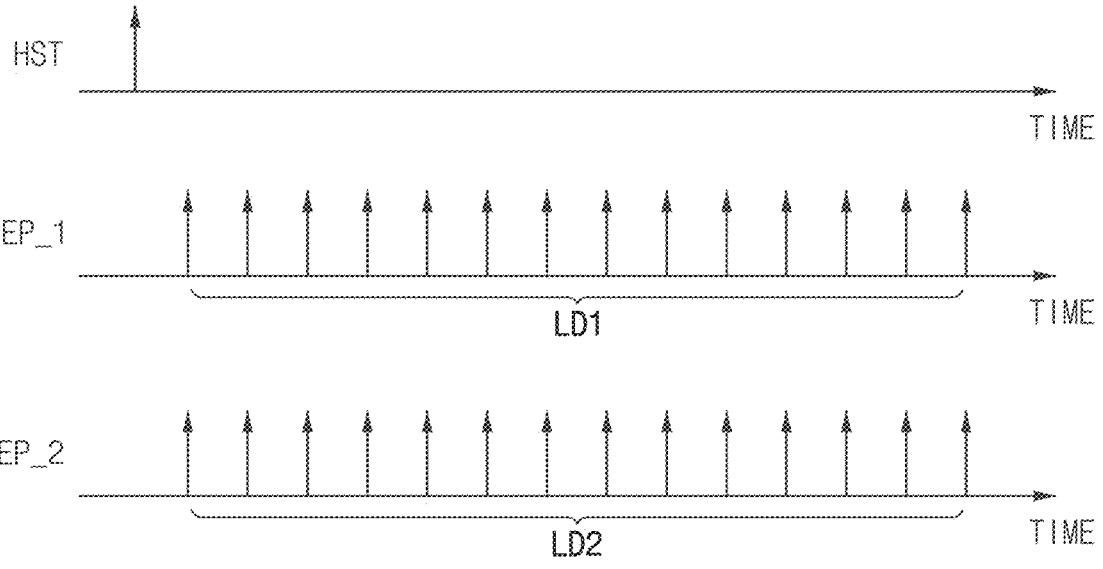
Figure 8C:
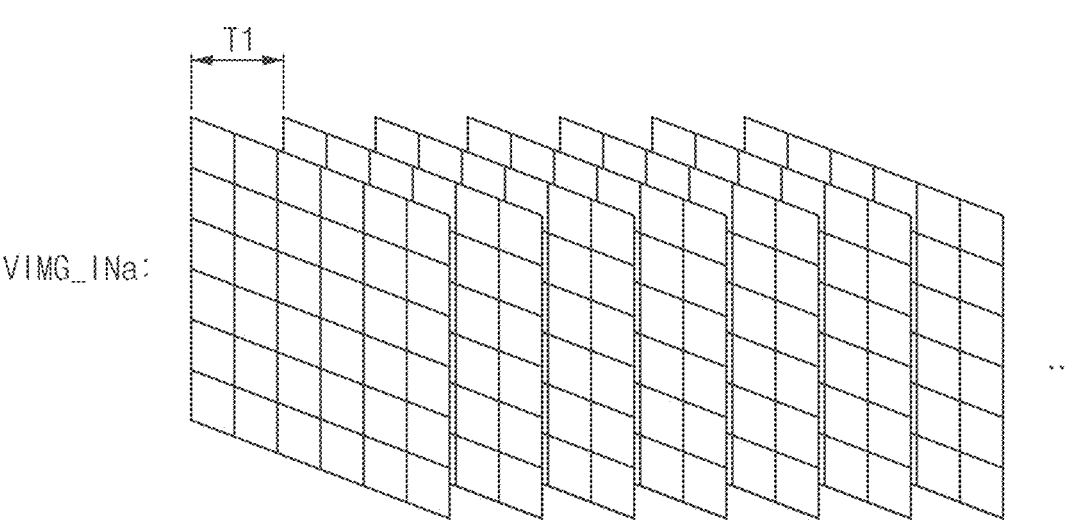
Figure 8C:
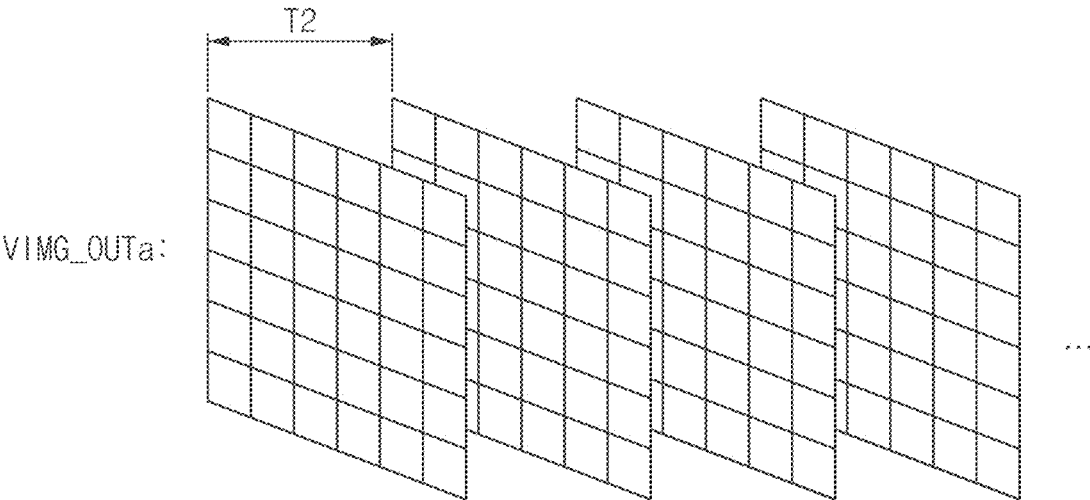

FIGS. 8A, 8B and 8C are diagrams for describing operations of a plurality of video processors of FIG. 7.

Referring to FIG. 8A, an example of signal timing when receiving the input image IMG_IN corresponding to the input video data VD_IN is illustrated. For example, a horizontal start signal HST may be a signal representing that one line image starts, and an input enable pulse signal EP_IN may be a signal representing that one image signal or video signal (e.g., one pixel signal) exists in one line image.

For example, the input image IMG_IN and the input video data VD_IN corresponding to the input image IMG_IN may be received with a first frame rate. For example, a reciprocal of a time interval between two adjacent arrows among a plurality of arrows included in the input enable pulse signal EP_IN may correspond to the first frame rate. For example, among the plurality of arrows included in the input enable pulse signal EP_IN, first and second line data LD1 and LD2 may correspond to one line image included in the input image IMG_IN, the first line data LD1 may be a portion of the one line image corresponding to the first sub-area SA1, and the second line data LD2 may be another portion of the one line image corresponding to the second sub-area SA2.

Referring to FIG. 8B, an example of signal timing when the first and second scalers 310a and 310b perform the scaling operation on the first and second input video sub-data SVD_IN_1 and SVD_IN_2 is illustrated. For example, a first enable pulse signal EP_1 may be a signal representing that one image signal exists when the first scaler 310a performs the scaling operation on the first line data LD1, and a second enable pulse signal EP_2 may be a signal representing that one image signal exists when the second scaler 310b performs the scaling operation on the second line data LD2.

For example, each of (or alternatively, at least one of) the first and second scalers 310a and 310b may perform the scaling operation based on a first data processing rate different from the first frame rate. For example, a reciprocal of a time interval between two adjacent arrows among a plurality of arrows included in each of (or alternatively, at least one of) the first and second enable pulse signals EP_1 and EP_2 may correspond to the first data processing rate. For example, the first data processing rate may be lower than the first frame rate.

Referring to FIG. 8C, an example of input images VIMG_INa corresponding to the input video data VD_IN is illustrated, and an example of output images VIMG_OUTa that are obtained by performing the operation described with reference to FIGS. 8A and 8B on the input images VIMG_INa and correspond to the output video data VD_OUT is illustrated.

For example, as described with reference to FIG. 8A, the input images VIMG_INa may be received with the first frame rate, and a reciprocal of a time interval T1 between two adjacent input frame images may correspond to the first frame rate.

For example, the output images VIMG_OUTa may be output with a second frame rate that is different from the first frame rate and is equal to the first data processing rate, and a reciprocal of a time interval T2 between two adjacent output frame images may correspond to the second frame rate. For example, the second frame rate may be lower than the first frame rate. In this case, images received with a relatively high frame rate may be processed with a relatively low processing rate, an existing device may be used without increasing the performance of the device, and the image processing may be efficiently performed without increasing the cost.

Figure 9:
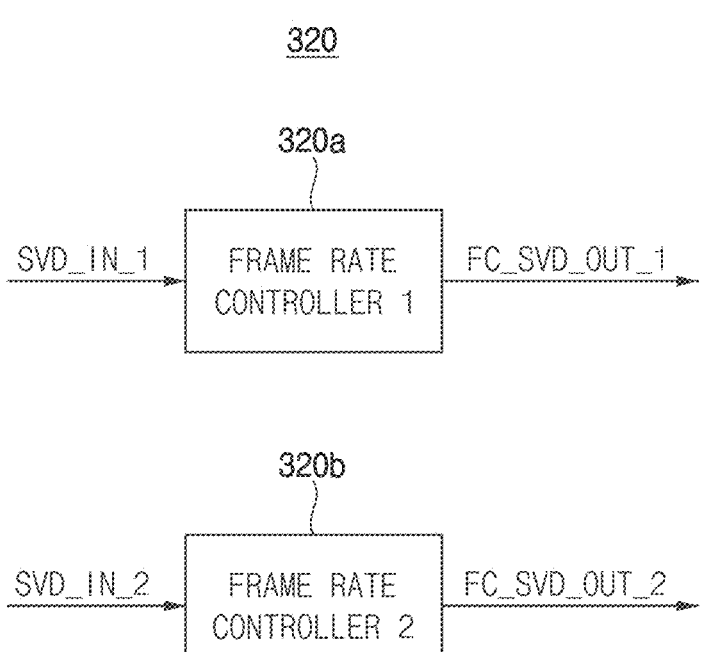
FIG. 9 is a block diagram illustrating an example of a plurality of video processors included in an image processing device of FIG. 1.

FIG. 9 is a block diagram illustrating an example of a plurality of video processors included in an image processing device of FIG. 1.

Referring to FIG. 9, a plurality of video processors 320 may include a plurality of frame rate controllers 320a and 320b that perform a frame rate controlling operation on the input video data VD_IN. For example, the plurality of frame rate controllers 320a and 320b may include a first frame rate controller 320a and a second frame rate controller 320b. The first frame rate controller 320a may generate first output video sub-data FC_SVD_OUT_1, which is video sub-data whose frame rate is adjusted, by performing the frame rate controlling operation on the first input video sub-data SVD_IN_1. The second frame rate controller 320b may generate second output video sub-data FC_SVD_OUT_2, which is video sub-data whose frame rate is adjusted, by performing the frame rate controlling operation on the second input video sub-data SVD_IN_2.

In some example embodiments, a frame rate may represent or correspond to the number of frame images displayed during a unit time interval. The image processing device 100 according to some example embodiments may be implemented to operate in a variable frame rate scheme in which a frame rate (or refresh rate) is not fixed and is changeable. The variable frame rate scheme may be referred to as a variable refresh rate (VRR) scheme, an adaptive refresh rate (ARR) scheme, or the like.

Figure 10:
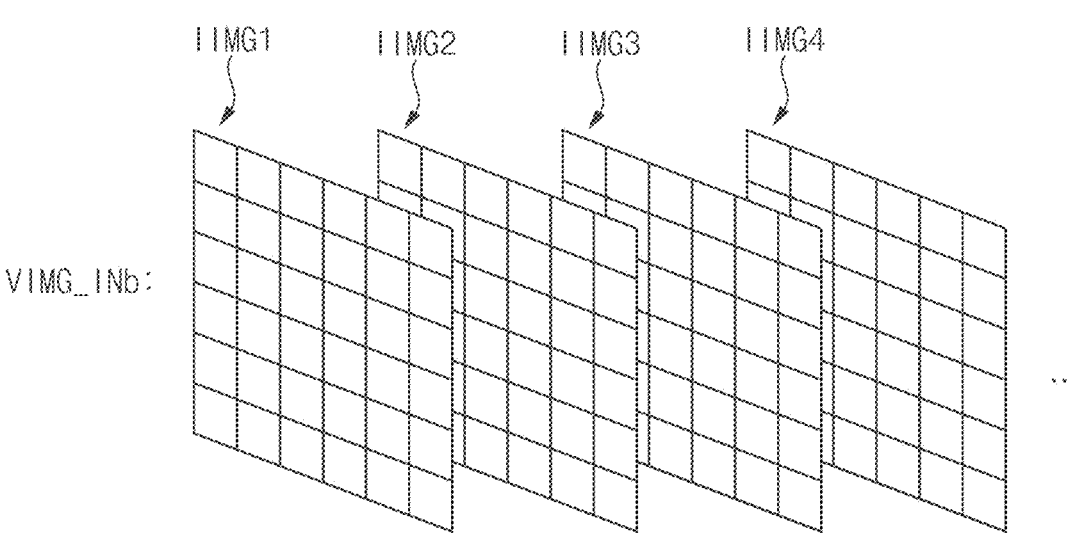
FIG. 10 is a diagram for describing operations of a plurality of video processors of FIG. 9.
Figure 10:
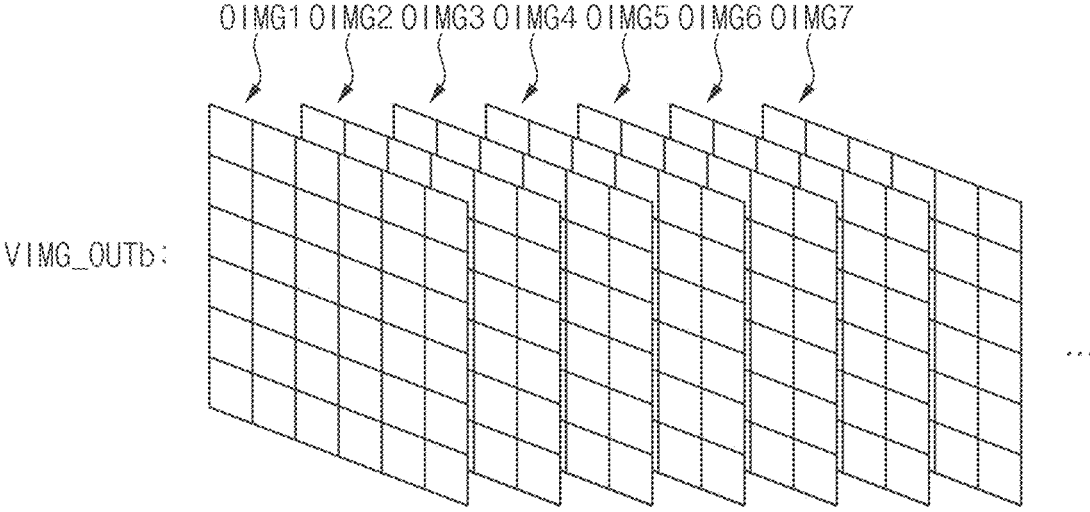

FIG. 10 is a diagram for describing operations of a plurality of video processors of FIG. 9.

Referring to FIG. 10, an example of input images VIMG_INb corresponding to the input video data VD_IN is illustrated, and an example of output images VIMG_OUTb that are obtained by performing the frame rate controlling operation on the input images VIMG_INb and correspond to the output video data VD_OUT is illustrated. For example, the input images VIMG_INb may include input frame images IIMG1, IIMG2, IIMG3 and IIMG4, and the output images VIMG_OUTb may include output frame images OIMG1, OIMG2, OIMG3, OIMG4, OIMG5, OIMG6 and OIMG7.

For example, the input images VIMG_INb may be received with a first frame rate, and the output images VIMG_OUTb may be output with a second frame rate different from the first frame rate. For example, the second frame rate may be higher than the first frame rate.

In some example embodiments, the plurality of frame rate controllers 320a and 320b may be implemented in various manners to perform the above-described frame rate controlling operation. For example, the output frame images OIMG1, OIMG3, OIMG5 and OIMG7 that are substantially identical to the input frame images IIMG1, IIMG2, IIMG3 and IIMG4, respectively, may be generated, and the output frame images OIMG2, OIMG4 and OIMG6 may be generated based on various schemes.

In some example embodiments, the output frame images OIMG2, OIMG4 and OIMG6 may be generated using a copy operation. For example, the output frame images OIMG2, OIMG4 and OIMG6 that are substantially identical to the input frame images IIMG1, IIMG2 and IIMG3, respectively, may be generated. In other words, the output frame images may be provided in a manner that each input frame image is repeatedly output several times.

In other example embodiments, the output frame images OIMG2, OIMG4 and OIMG6 may be generated using an interpolation operation. For example, the output frame image OIMG2 may be generated by performing the interpolation operation based on the input frame images IIMG1 and IIMG2, the output frame image OIMG4 may be generated by performing the interpolation operation based on the input frame images IIMG2 and IIMG3, and the output frame image OIMG6 may be generated by performing the interpolation operation based on the input frame images IIMG3 and IIMG4.

However, example embodiments are not limited thereto, and various other schemes and/or techniques may be used for generating the output frame images OIMG2, OIMG4 and OIMG6.

Figure 11A:
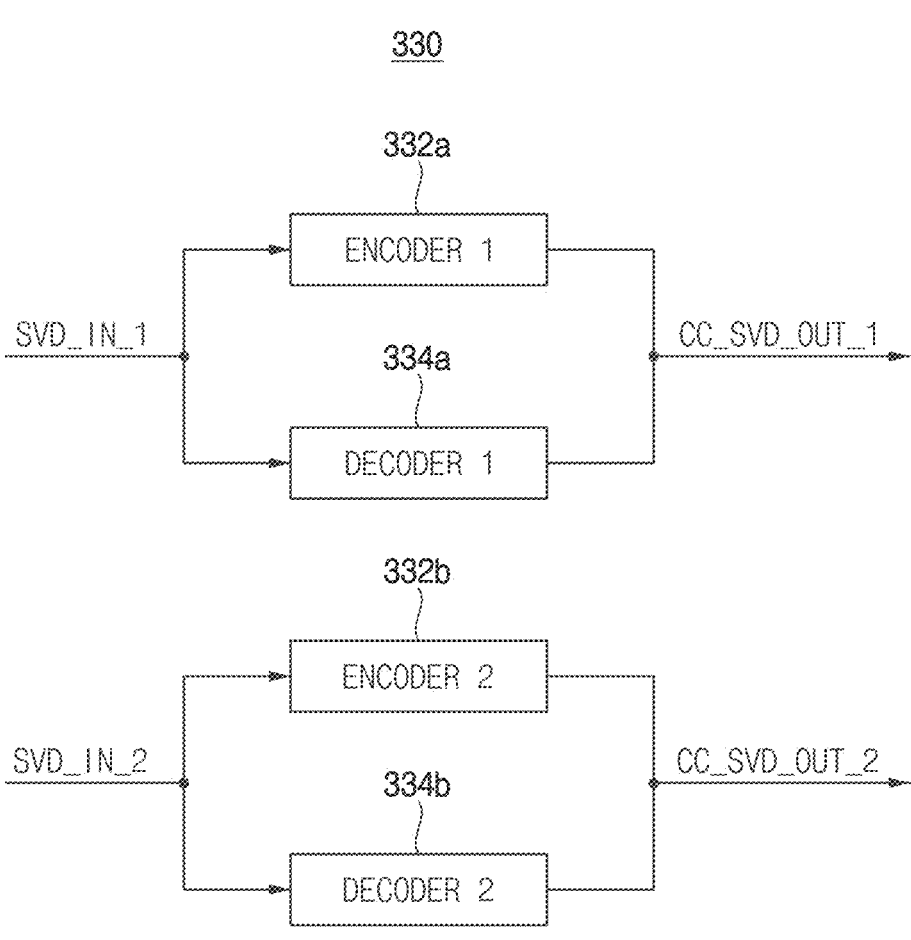
FIGS. 11A, 11B and 11C are block diagrams illustrating examples of a plurality of video processors included in an image processing device of FIG. 1.
Figure 11B:
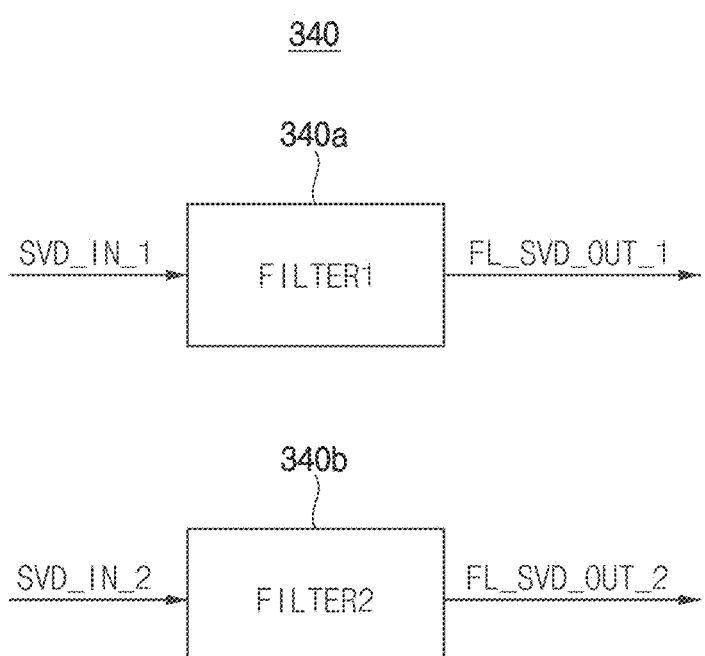
Figure 11C:
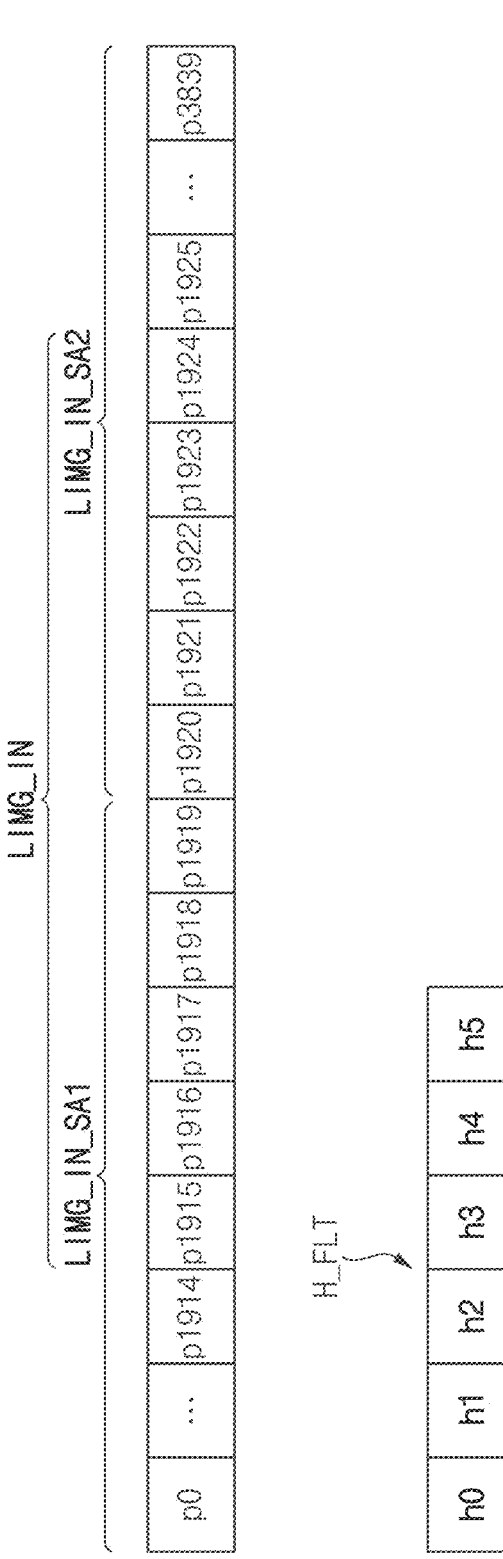

FIGS. 11A, 11B and 11C are block diagrams illustrating examples of a plurality of video processors included in an image processing device of FIG. 1.

Referring to FIG. 11A, a plurality of video processors 330 may include at least one of a plurality of encoders 332a and 332b that perform an encoding operation on the input video data VD_IN, and a plurality of decoders 334a and 334b that perform a decoding operation on the input video data VD_IN. For example, the plurality of encoders 332a and 332b may include a first encoder 332a and a second encoder 332b, and the plurality of decoders 334a and 334b may include a first decoder 334a and a second decoder 334b. The first encoder 332a and the first decoder 334a may generate first output video sub-data CC_SVD_OUT_1, which is encoded or decoded video sub-data, by performing the encoding operation and the decoding operation on the first input video sub-data SVD_IN_1. The second encoder 332b and the second decoder 334b may generate second output video sub-data CC_SVD_OUT_2, which is encoded or decoded video sub-data, by performing the encoding operation and the decoding operation on the second input video sub-data SVD_IN_2.

In some example embodiments, at least one of various coding schemes, such as Joint Photographic Experts Group (JPEG), Moving Picture Expert Group (MPEG), H.264, High Efficiency Video Coding (HEVC), etc., may be applied to the input video data VD_IN and/or the output video data VD_OUT. When the encoding operation is required (or alternatively, used) on the input video data VD_IN, the plurality of encoders 332a and 332b may be used. When the input video data VD_IN is provided in an encoded format, the plurality of decoders 334a and 334b may be used to perform the decoding operation.

Although FIG. 11A illustrates that all of the plurality of encoders 332a and 332b and the plurality of decoders 334a and 334b are included in the plurality of video processors 330, example embodiments are not limited thereto. For example, the plurality of video processors may include only the plurality of encoders 332a and 332b, or may include only the plurality of decoders 334a and 334b.

Referring to FIG. 11B, a plurality of video processors 340 may include a plurality of filters 340a and 340b that perform a filtering operation on the input video data VD_IN. For example, the plurality of filters 340a and 340b may include a first filter 340a and a second filter 340b. The first filter 340a may generate first output video sub-data FL_SVD_OUT_1, which is filtered video sub-data, by performing the filtering operation on the first input video sub-data SVD_IN_1. The second filter 340b may generate second output video sub-data FL_SVD_OUT_2, which is filtered video sub-data, by performing the frame rate control operation on the second input video sub-data SVD_IN_2.

In some example embodiments, at least one of various filtering schemes, such as horizontal filtering scheme, vertical filtering scheme, etc., may be applied to the input video data VD_IN.

Referring to FIG. 11C, an example of the filtering operation performed by the plurality of filters 340a and 340b in FIG. 11B is illustrated. For example, FIG. 11C illustrates an example of a horizontal filtering scheme.

For example, a partial input image LIMG_IN may be a portion of an input image (e.g., the input image IMG_IN of FIG. 2A) corresponding to the input video data VD_IN, and may include a plurality of pixel values p0, . . . , p1914, p1915, p1916, p1917, p1918, p1919, p1920, p1921, p1922, p1923, p1924, p1925, . . . , p3839. For example, the partial input image LIMG_IN may be a line image corresponding to one line of the input image IMG_IN. The partial input image LIMG_IN may include a first partial input sub-image LIMG_IN_SA1 that corresponds to a first sub-area (e.g., the first sub-area SA1 in FIG. 2A) and includes the pixel values p0 to p1919, and a second partial input sub-image LIMG_IN_SA2 that corresponds to a second sub-area (e.g., the second sub-area SA2 in FIG. 2A) and includes the pixel values p1920 to p3839. A horizontal filter H_FLT may include a plurality of filter coefficients h0, h1, h2, h3, h4 and h5. However, the number of pixel values and the number of filter coefficients are not limited to as illustrated in FIG. 11C.

The horizontal filtering scheme (or process) may be performed by applying the horizontal filter H_FLT to the partial input image LIMG_IN. For example, a filtered pixel value corresponding to the pixel value p1916 may be $o1916=p1914*h0+p1915*h1+p1916*h2+p1917*h3+p1918*h4+p1919*h5$, and a filtered pixel value corresponding to the pixel value p1922 may be $o1922=p1920*h0+p1921*h1+p1922*h2+p1923*h3+p1924*h4+p1925*h5$.

Conventionally, the data related to the boundary between sub-areas were not used, and a conventional filtering process was performed according to one of the following two schemes. Hereinafter, the conventional filtering process for the first partial input sub-image LIMG_IN_SA1 is described.

1) A repetition scheme in which a pixel value (e.g., the pixel value p1919) of the closest pixel (e.g., the rightmost pixel) to a boundary is repeatedly used: For example, a filtered pixel value corresponding to the pixel value p1917 may be $o1917'=p1915*h0+p1916*h1+p1917*h2+$ p1918*h3+p1919*h4+p1919*h5, a filtered pixel value corresponding to the pixel value p1918 may be o1918'=p1916*h0+p1917*h1+p1918*h2+p1919*h3+ p1919*h4+p1919*h5, and a filtered pixel value corresponding to the pixel value p1919 may be o1919'=p1917*h0+ p1918*h1+p1919*h2+p1919*h3+p1919*h4+p1919*h5.

2) A mirroring scheme in which pixel values (e.g., the pixel values p1916, p1917 and p1918) of adjacent pixels neighboring the closest pixel (e.g., the rightmost pixel) to a boundary are used by reflecting in the left direction: For example, a filtered pixel value corresponding to the pixel value p1917 may be O1917"=p1915*h0+p1916*h1+ p1917*h2+p1918*h3+p1918*h4+p1919*h5, a filtered pixel value corresponding to the pixel value p1918 may be O1918"=p1916*h0+p1917*h1+p1918*h2+p1917*h3+ p1918*h4+p1919*h5, and a filtered pixel value corresponding to the pixel value p1919 may be O1919"=p1917*h0+ p1918*h1+p1916*h2+p1917*h3+p1918*h4+p1919*h5.

In both of the above-described conventional schemes, a side effect in which the boundary between the sub-areas appears broken may occur when images are merged after the filtering process.

In contrast, when the data related to the boundary between the sub-areas are used during the image processing according to some example embodiments, a filtered pixel value corresponding to the pixel value p1917 may be o1917=p1915*h0+p1916*h1+p1917*h2+p1918*h3+ p1919*h4+p1920*h5, a filtered pixel value corresponding to the pixel value p1918 may be o1918=p1916*h0+p1917*h1+ p1918*h2+p1919*h3+p1920*h4+p1921*h5, and a filtered pixel value corresponding to the pixel value p1919 may be o1919=p1917*h0+p1918*h1+p1919*h2+p1920*h3+ p1921*h4+p1922*h5. In other words, the filtered pixel values may be substantially equal to when the filtering operation is performed without dividing the image. Therefore, the discontinuity may be prevented or hindered from occurring at the boundary between the sub-areas even if images are merged after the filtering process.

Although some example embodiments are described based on a specific scaling operation, a specific data processing rate control operation, a specific frame rate controlling operation, a specific encoding and decoding operation and a specific filtering operation, example embodiments are not limited thereto. For example, some example embodiments may be applied or employed to various image processing operations. For example, the plurality of video processors 300 may be implemented to perform a blending operation of a plurality of layers, various other filtering operations, and/or various image quality enhancement operations such as a detail enhancement (DE), an adaptive tone map control (ATC), a hue saturation control (HSC), a gamma and a de-gamma, an Android open source project (AOSP), a color gamut control (CGC), a dithering (or dither), a round corner display (RCD), a sub-pixel rendering (SPR), and/or the like. The DE may represent an algorithm for sharpening an outline of an image. The ATC may represent an algorithm for improving the outdoor visibility. The HSC may represent an algorithm for improving the hue and saturation for color. The gamma may represent an algorithm for gamma correction or compensation. The AOSP may represent an algorithm for processing an image conversion matrix (e.g., a mode for a color-impaired person or a night mode) defined by the Android OS. The CGC may represent an algorithm for matching color coordinates of a display panel. The dithering may represent an algorithm for expressing the effect of color of high bits using limited colors. The RCD may represent an algorithm for processing rounded corners of a display panel. The SPR may represent an algorithm for increasing the resolution.

Figure 13:
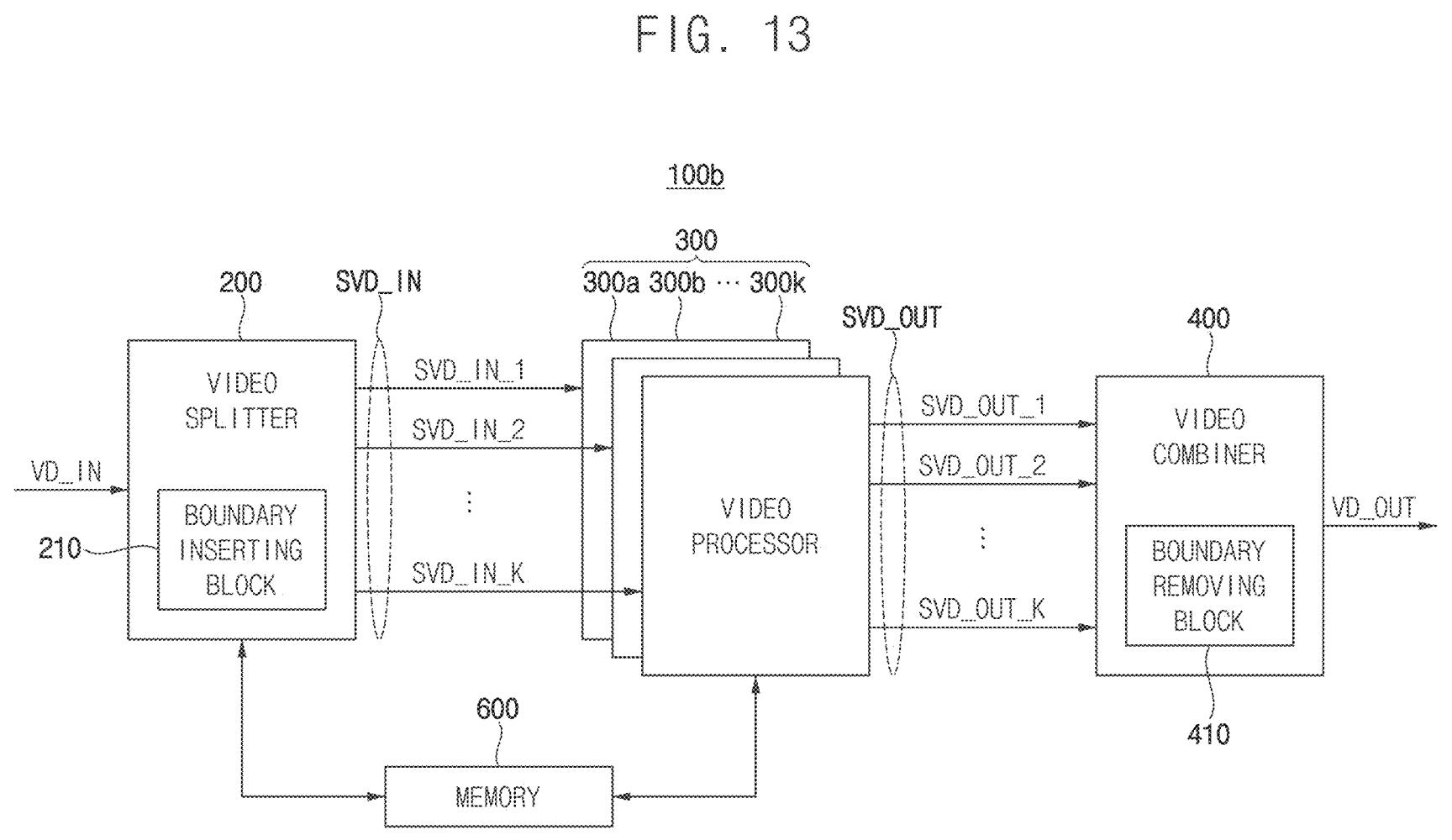

FIGS. 12 and 13 are block diagrams illustrating an image processing device according to some example embodiments. The descriptions repeated with FIG. 1 are omitted for brevity.

Referring to FIG. 12, an image processing device 100a includes a video splitter 200, a plurality of video processors 300 and a video combiner 400. The image processing device 100a may further include a memory 500 and a direct memory access (DMA) block 550.

The image processing device 100a of FIG. 12 may be substantially the same as the image processing device 100 of FIG. 1, except that the image processing device 100a further includes the memory 500 and the DMA block 550.

The memory 500 may receive the input video data VD_IN from the outside of the image processing device 100a (e.g., from an external device located outside the image processing device 100a), and may store the input video data VD_IN. For example, the memory 500 may operate as a frame buffer. For example, the memory 500 may include a dynamic random access memory (DRAM). The video splitter 200 may receive the input video data VD_IN from the memory 500 by performing a DMA operation through the DMA block 550. Although not illustrated in FIG. 12, the DMA block 550 may be included in the video splitter 200.

Unlike the image processing device 100 of FIG. 1 in which the video splitter 200 directly receives the input video data VD_IN without a frame buffer (e.g., based on an on-the-fly scheme), in the image processing device 100a of FIG. 12, the memory 500 may receive and store the input video data VD_IN, and the video splitter 200 may receive the input video data VD_IN from the memory 500 by the DMA operation.

Referring to FIG. 13, an image processing device 100b includes a video splitter 200, a plurality of video processors 300 and a video combiner 400. The image processing device 100b may further include a memory 600.

The image processing device 100b of FIG. 13 may be substantially the same as the image processing device 100 of FIG. 1, except that the image processing device 100b further includes the memory 600.

The memory 600 may temporarily store at least one of the plurality of input video sub-data SVD_IN generated by the video splitter 200 and the plurality of output video sub-data SVD_OUT generated by the plurality of video processors 300. For example, the memory 600 may include a static random access memory (SRAM). However, example embodiments are not limited thereto, and the memory 600 may also temporarily store at least one of date related to the image splitting operation performed by the video splitter 200 and data related to the image processing operation performed by the plurality of video processors 300.

In some example embodiments, the image processing device according to some example embodiments may be implemented by combining two or more of examples described with reference to FIGS. 1 through 13.

FIGS. 14A, 14B, 14C, 14D, 14E, 15A, 15B, 15C, 15D and 15E are diagrams for describing an operation of an image processing device according to some example embodiments. The descriptions repeated with FIGS. 2A, 2B, 2C, 2D and 2E are omitted for brevity.

FIGS. 14A, 14B, 14C, 14D and 14E illustrate an example where an image is divided into three sub-areas, e.g., an example where K=3 in FIG. 1. For example, the image processing device 100 of FIG. 1 may include three video processors.

Figure 14A:
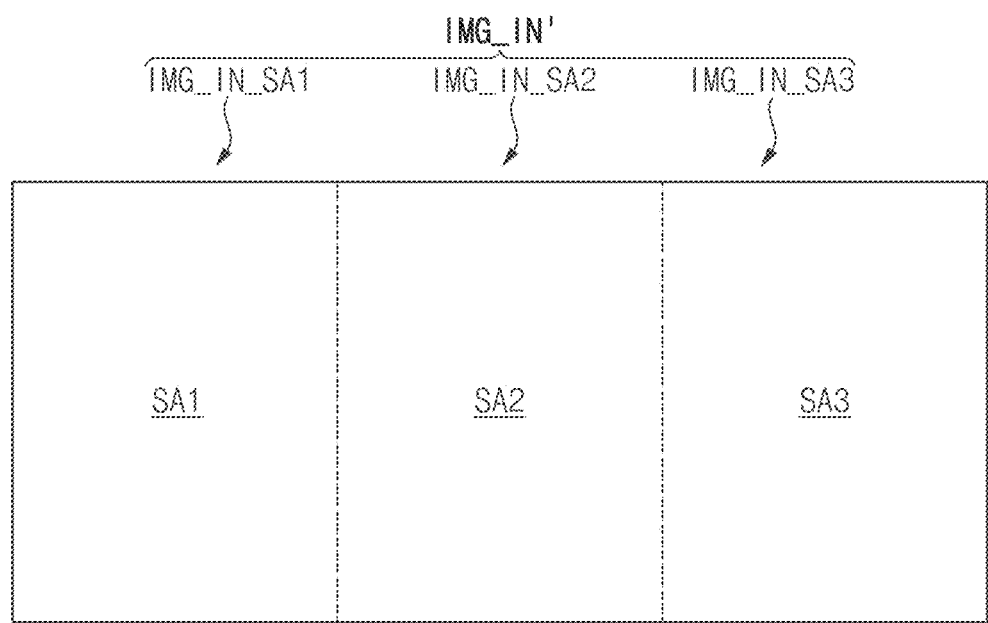
FIGS. 14A, 14B, 14C, 14D, 14E, 15A, 15B, 15C, 15D and 15E are diagrams for describing an operation of an image processing device according to some example embodiments.

Referring to FIG. 14A, an input image IMG_IN' may include a first main input sub-image IMG_IN_SA1 corresponding to a first sub-area SA1, a second main input sub-image IMG_IN_SA2 corresponding to a second sub-area SA2, and a third main input sub-image IMG_IN_SA3 corresponding to a third sub-area SA3. The third sub-area SA3 may be adjacent to the second sub-area SA2.

Figure 14B:
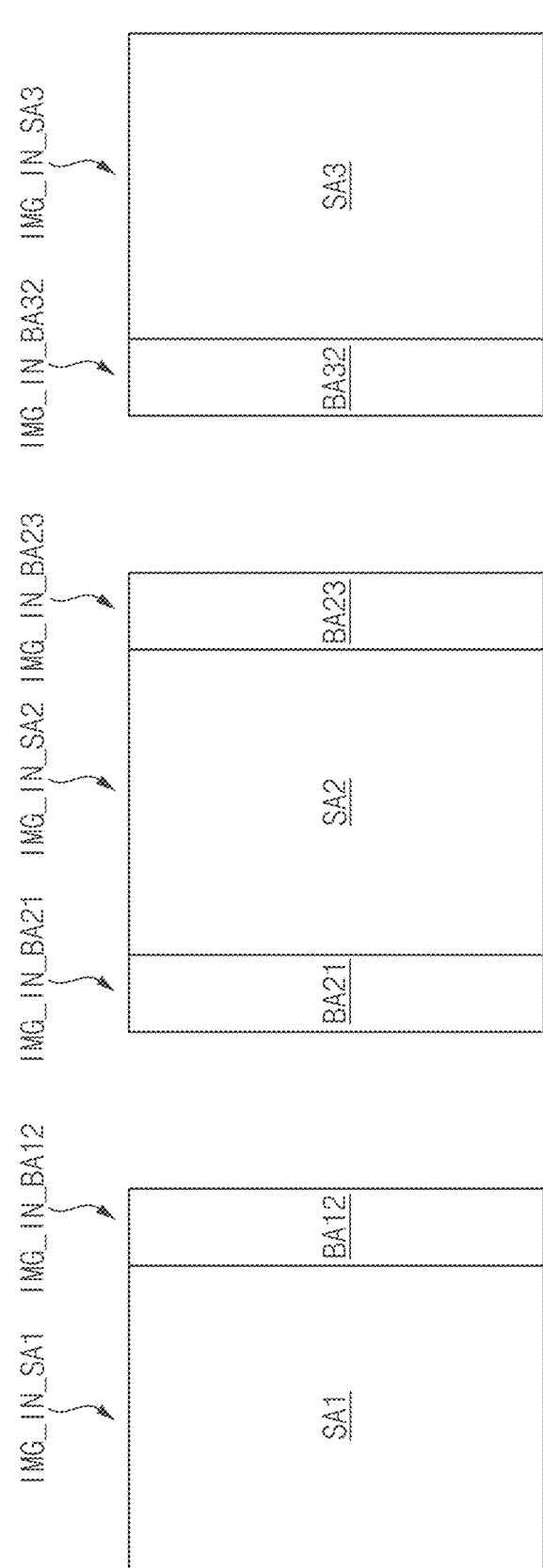

Referring to FIG. 14B, an image splitting operation in which the input image IMG_IN' is divided into the first, second and third main input sub-images IMG_IN_SA1, IMG_IN_SA2 and IMG_IN_SA3 may be performed, and data related to boundaries between the first, second and third sub-areas SA1, SA2 and SA3 may be used together while the image splitting operation is performed. For example, a first boundary input sub-image IMG_IN_BA12 corresponding to a first boundary area BA12 may be provided together with the first main input sub-image IMG_IN_SA1. A third boundary input sub-image IMG_IN_BA32 corresponding to a third boundary area BA32 may be provided together with the third main input sub-image IMG_IN_SA3. A second boundary input sub-image IMG_IN_BA21 corresponding to a second boundary area BA21 and a fourth boundary input sub-image IMG_IN_BA23 corresponding to a fourth boundary area BA23 may be provided together with the second main input sub-image IMG_IN_SA2. For example, the third boundary area BA32 may be a second portion of the second sub-area SA2, and the fourth boundary area BA23 may be a first portion of the third sub-area SA3.

Figure 14C:
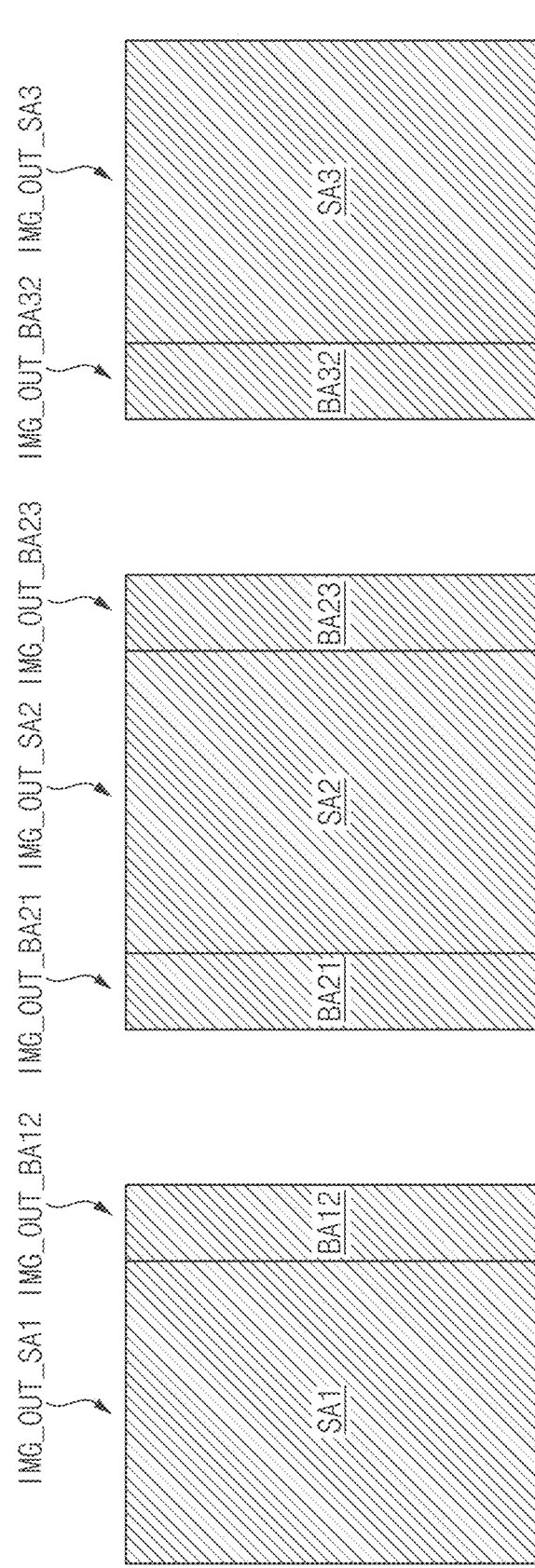

Referring to FIG. 14C, image processing operations may be performed on both the data related to the sub-areas SA1, SA2 and SA3 and the data related to the boundaries between the sub-areas SA1, SA2 and SA3. For example, a first main output sub-image IMG_OUT_SA1 corresponding to the first sub-area SA1 and a first boundary output sub-image IMG_OUT_BA12 corresponding to the first boundary area BA12 may be generated. A third main output sub-image IMG_OUT_SA3 corresponding to the third sub-area SA3 and a third boundary output sub-image IMG_OUT_BA32 corresponding to the third boundary area BA32 may be generated. A second main output sub-image IMG_OUT_SA2 corresponding to the second sub-area SA2, a second boundary output sub-image IMG_OUT_BA21 corresponding to the second boundary area BA21 and a fourth boundary output sub-image IMG_OUT_BA23 corresponding to the fourth boundary areas BA23 may be generated.

Figure 14D:
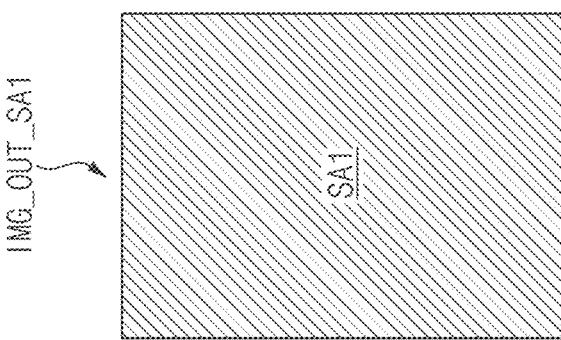
Figure 14D:
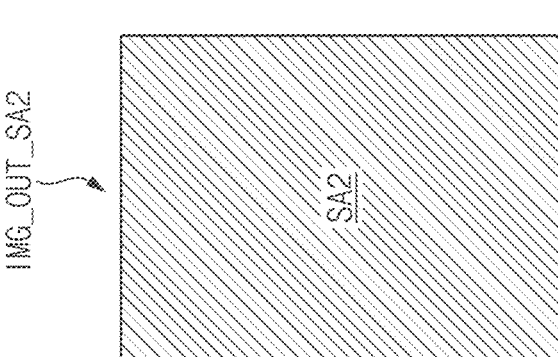
Figure 14D:
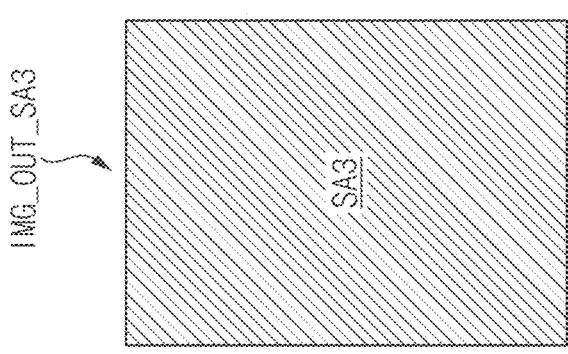
Figure 14E:
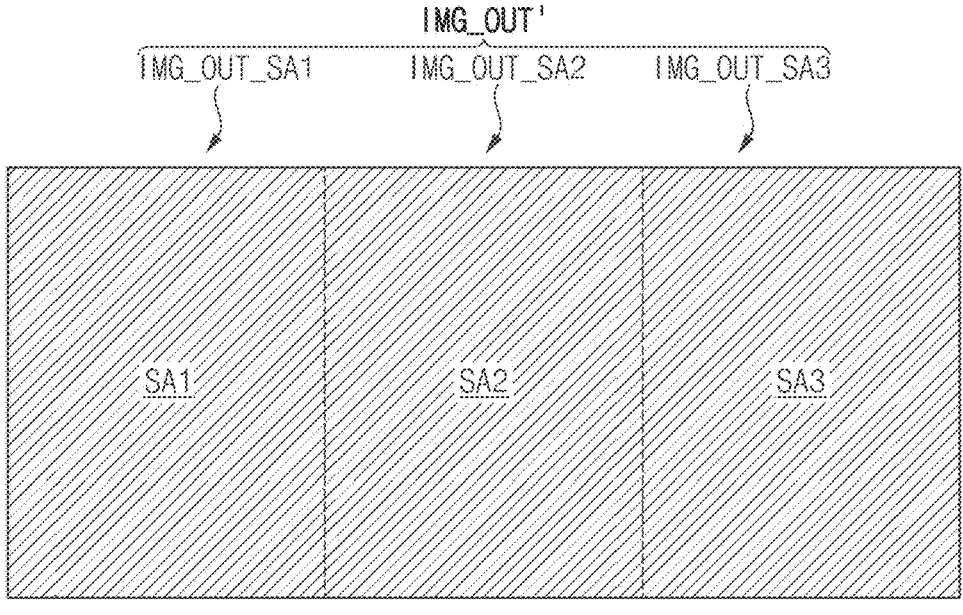

Referring to FIGS. 14D and 14E, an image combining operation in which only the data related to the sub-areas SA1, SA2 and SA3 are used without using the data related to the boundaries between the sub-areas SA1, SA2 and SA3 may be performed. For example, the first, second, third and fourth boundary output sub-images IMG_OUT_BA12, IMG_OUT_BA21, IMG_OUT_BA32 and IMG_OUT_BA23 may be removed, and an output image IMG_OUT' including the first, second and third main output sub-images IMG_OUT_SA1, IMG_OUT_SA2 and IMG_OUT_SA3 may be generated.

FIGS. 15A, 15B, 15C, 15D and 15E also illustrate an example where an image is divided into three sub-areas, e.g., an example where K=3 in FIG. 1.

Figure 15A:
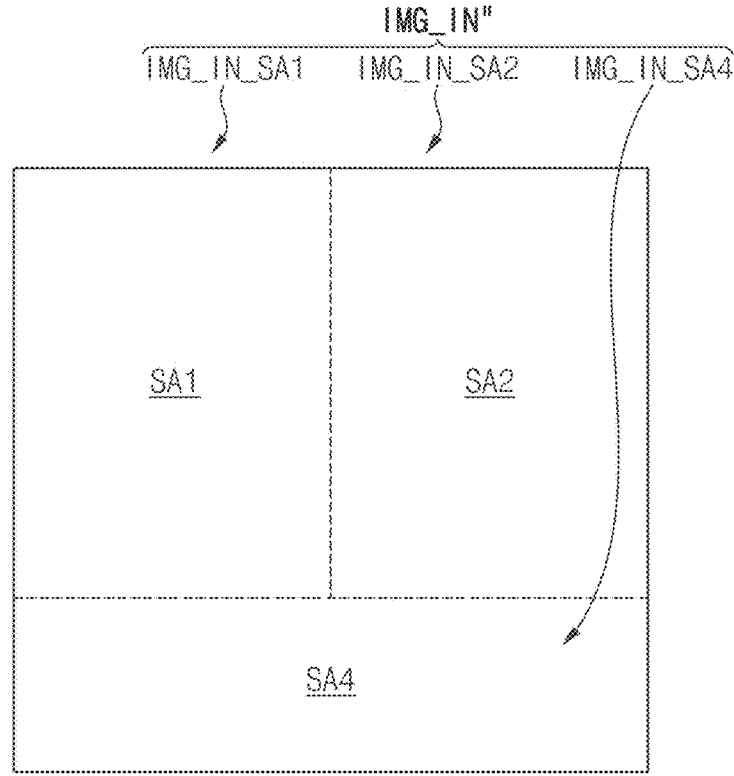

Referring to FIG. 15A, an input image IMG_IN" may include a first main input sub-image IMG_IN_SA1 corresponding to a first sub-area SA1, a second main input sub-image IMG_IN_SA2 corresponding to a second sub-area SA2, and a fourth main input sub-image IMG_IN_SA4 corresponding to a fourth sub-area SA4. The third sub-area SA3 may be adjacent to the second sub-area SA2. The fourth sub-area SA4 may be adjacent to both the first and second sub-areas SA1 and SA2.

Figure 15B:
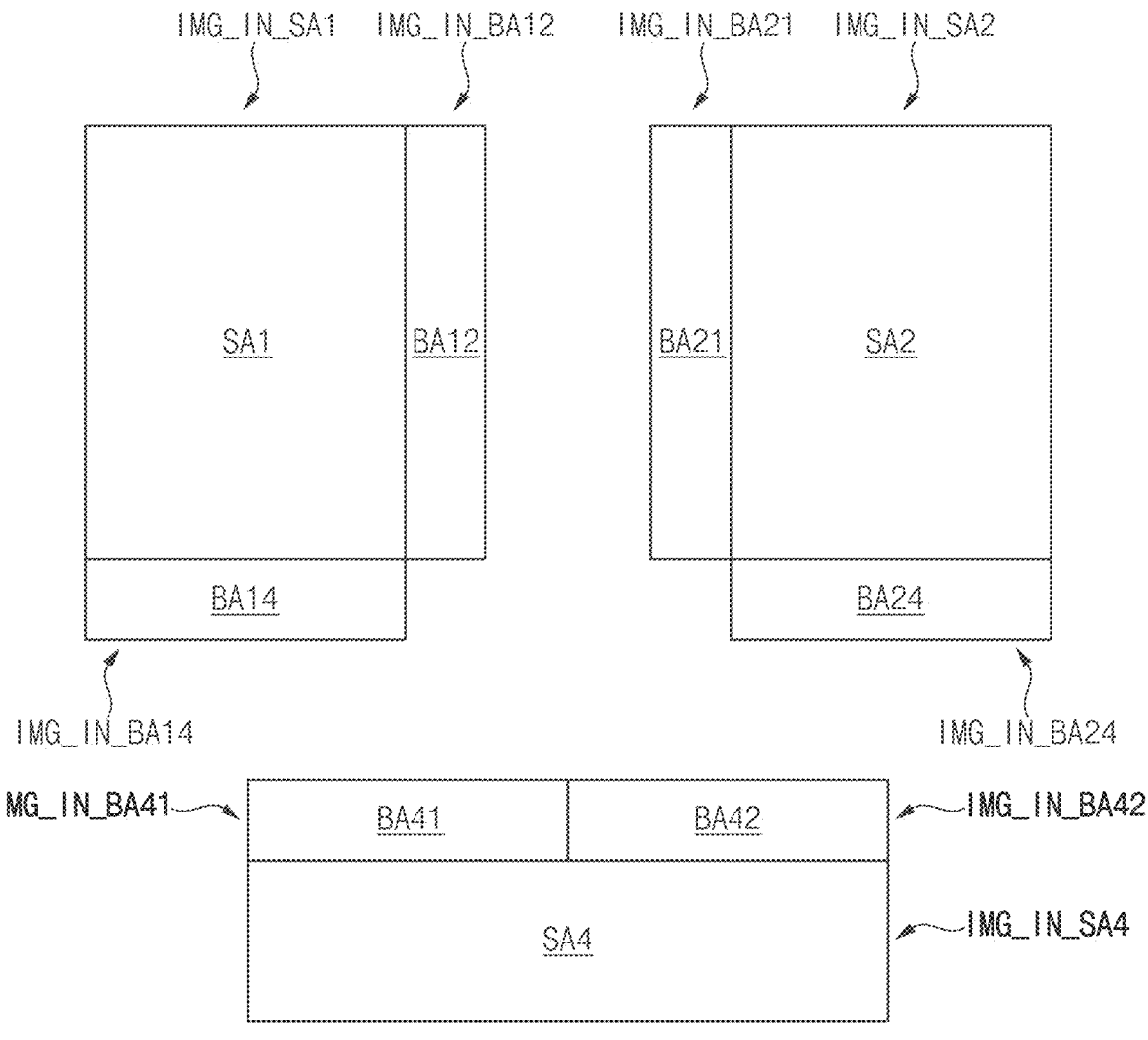

Referring to FIG. 15B, an image splitting operation in which the input image IMG_IN" is divided into the first, second and fourth main input sub-images IMG_IN_SA1, IMG_IN_SA2 and IMG_IN_SA4 may be performed, and data related to boundaries between the first, second and third sub-areas SA1, SA2 and SA4 may be used together while the image splitting operation is performed. For example, a first boundary input sub-image IMG_IN_BA12 corresponding to a first boundary area BA12 and a fifth boundary input sub-image IMG_IN_BA15 corresponding to a fifth boundary area BA14 may be provided together with the first main input sub-image IMG_IN_SA1. A second boundary input sub-images IMG_IN_BA21 corresponding to a second boundary area BA21 and a sixth boundary input sub-image IMG_IN_BA24 corresponding to a sixth boundary area BA21 and BA24 may be provided together with the second main input sub-image IMG_IN_SA2. A seventh boundary input sub-image IMG_IN_BA41 corresponding to a seventh boundary area BA41 and an eighth boundary input sub-image IMG_IN_BA42 corresponding to an eighth boundary area BA42 may be provided together with the fourth main input sub-image IMG_IN_SA4. For example, the fifth boundary area BA14 may be a second portion of the first sub-area SA1, the sixth boundary area BA21 may be a second portion of the second sub-area SA2, the seventh boundary area BA41 may be a first portion of the fourth sub-area SA4, and the eighth boundary area BA42 may be a second portion of the fourth sub-area SA4.

Figure 15C:
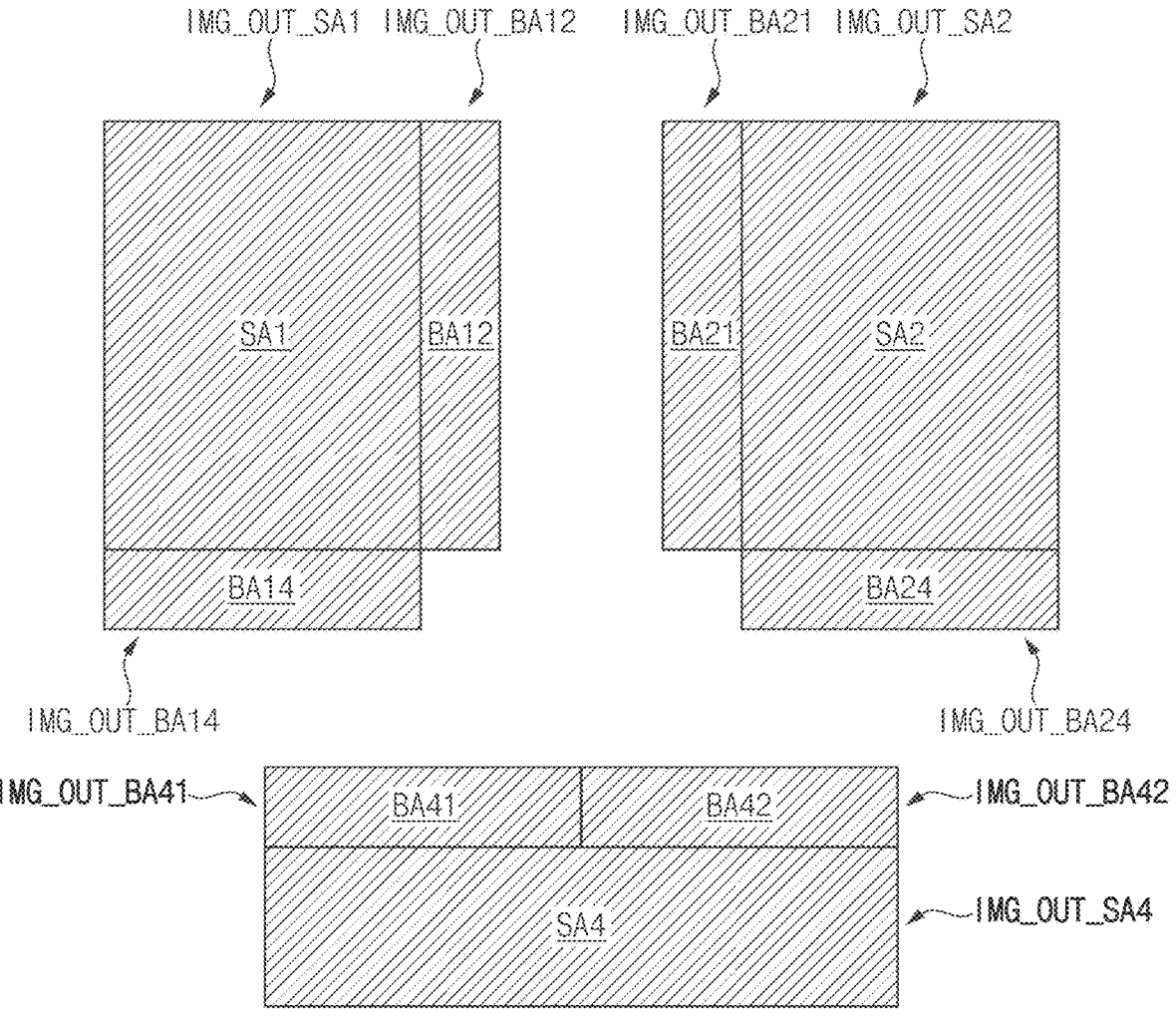

Referring to FIG. 15C, image processing operations may be performed on both the data related to the sub-areas SA1, SA2 and SA4 and the data related to the boundaries between the sub-areas SA1, SA2 and SA4. For example, a first main output sub-image IMG_OUT_SA1 corresponding to the first sub-area SA1, a first boundary output sub-image IMG_OUT_BA12 corresponding to the first boundary area BA12 and a fifth boundary output sub-image IMG_OUT_BA14 corresponding to the fifth boundary area BA14 may be generated. A second main output sub-image IMG_OUT_SA2 corresponding to the second sub-area SA2, a second boundary output sub-image IMG_OUT_BA21 corresponding to the second boundary area BA21 and a sixth boundary output sub-image IMG_OUT_BA24 corresponding to the sixth boundary area BA24 may be generated. A fourth main output sub-image IMG_OUT_SA4 corresponding to the fourth sub-area SA4, a seventh boundary output sub-image IMG_OUT_BA41 corresponding to the seventh boundary area BA41 and an eighth boundary output sub-image IMG_OUT_BA42 corresponding to the eighth boundary area BA42 may be generated.

Figure 15D:
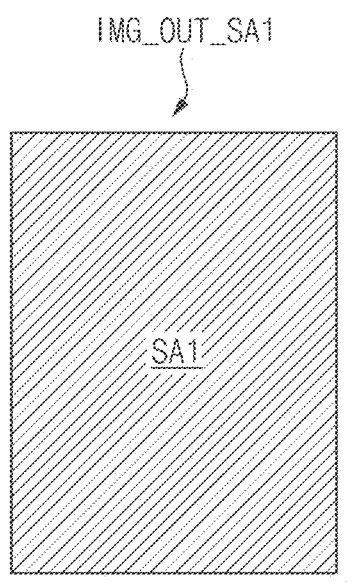
Figure 15D:
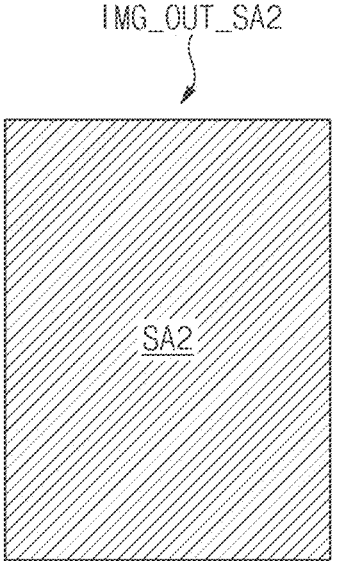
Figure 15D:
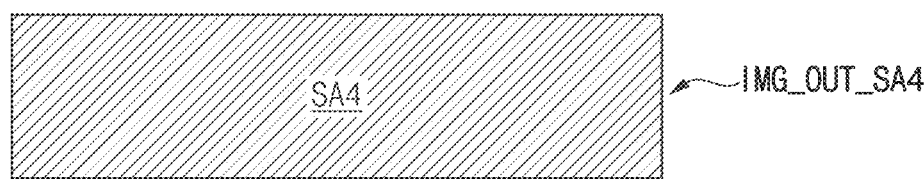
Figure 15E:
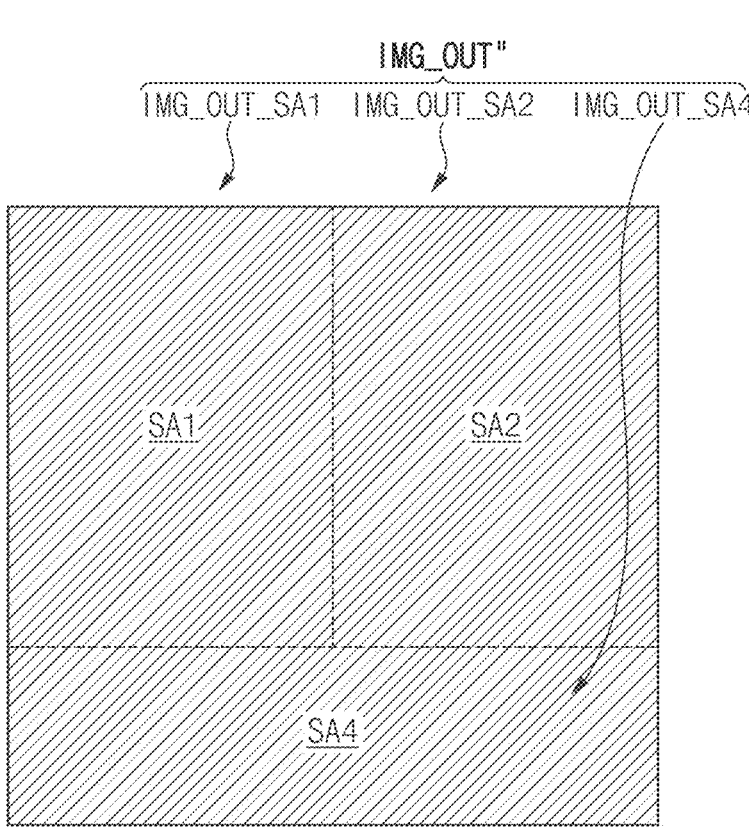

Referring to FIGS. 15D and 15E, an image combining operation in which only the data related to the sub-areas SA1, SA2 and SA4 are used without using the data related to the boundaries between the sub-areas SA1, SA2 and SA4 may be performed. For example, the first, second, fifth, sixth, seventh and eighth boundary output sub-images IMG_OUT_BA12, IMG_OUT_BA21, IMG_OUT_BA14, IMG_OUT_BA24, IMG_OUT_BA41 and IMG_OUT_BA42 may be removed, and an output image IMG_OUT" including the first, second and fourth main output sub-images IMG_OUT_SA1, IMG_OUT_SA2 and IMG_OUT_SA4 may be generated.

Although some example embodiments are described based on that the image is divided into two or three sub-areas, example embodiments are not limited thereto. For example, the image may be divided into four or more sub-areas, and the image splitting operation may be performed in various manners according to some example embodiments.

Figure 16:
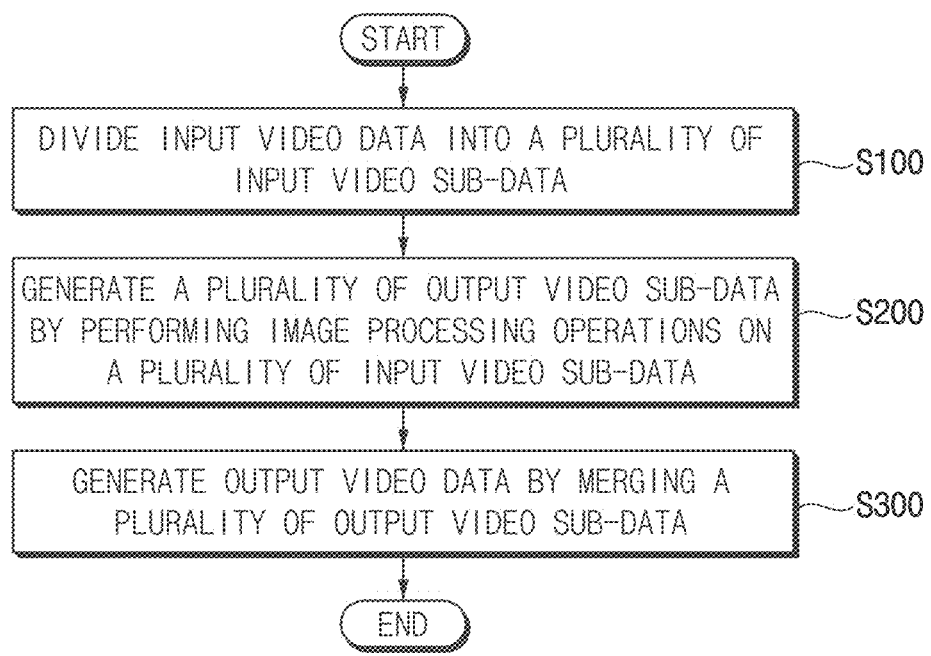
FIG. 16 is a flowchart illustrating an image processing method according to some example embodiments.

FIG. 16 is a flowchart illustrating an image processing method according to some example embodiments.

Referring to FIG. 16, an image processing method according to some example embodiments may be performed the image processing device according to some example embodiments described with reference to FIGS. 1 through 15.

In the image processing method according to some example embodiments, input video data is divided into a plurality of input video sub-data corresponding to a plurality of sub-areas (operation S100). For example, to prevent or hinder the discontinuous display of boundaries between the plurality of sub-areas by image processing operations, the data related to the boundary area may be added to each of (or alternatively, at least one of) the plurality of input video sub-data. For example, operation S100 may be performed by the video splitter 200 in FIG. 1.

A plurality of output video sub-data are generated, respectively, by performing image processing operations on the plurality of input video sub-data, respectively (operation S200). For example, the image processing operation may also be performed on the data related to the boundary area. For example, the image processing operations may be independently and/or individually performed. For example, operation S200 may be performed by the plurality of video processors 300 in FIG. 1, and various image processing operations described with reference to FIGS. 3, 4A, 4B, 4C, 5, 6A, 6B, 7, 8A, 8B, 8C, 9, 10, 11A, 11B and 11C may be used.

Output video data corresponding to the input video data is generated by merging the plurality of output video sub-data (operation S300). For example, the data related the boundary area added to each of (or alternatively, at least one of) the plurality of input video sub-data in operation S100 may be deleted, and thus the discontinuous display of boundaries between the plurality of sub-areas may be prevented finally. For example, operation S300 may be performed by the video combiner 400 in FIG. 1.

As will be appreciated by those skilled in the art, the described example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 17 is a block diagram illustrating an electronic system according to some example embodiments.

Referring to FIG. 17, an electronic system 1000 includes an image processing device 1100 and a display device 1200.

In some example embodiments, the electronic system 1000 may be implemented as a digital TV that outputs and/or displays high resolution images. However, example embodiments are not limited thereto. For example, as is described with reference to FIG. 21, the electronic system 1000 may further include various peripheral devices.

The image processing device 1100 generates output video data VD_OUT, which is used for displaying an image on the display device 1200, based on input video data VD_IN. The image processing device 1100 may be the image processing device according to example embodiments described with reference to FIGS. 1, 2A, 2B, 2C, 2D, 2E, 3, 4A, 4B, 4C, 5, 6A, 6B, 7, 8A, 8B, 8C, 9, 10, 11A, 11B, 11C, 12, 13, 14A, 14B, 14C, 14D, 14E, 15A, 15B, 15C, 15D and 15E. The input video may be split to correspond to the plurality of sub-areas, the independent image processing operations may be performed on the split videos, the output video may be generated by combining the image-processed videos, and thus high throughput may be achieved without increasing cost. In addition, the discontinuity at the boundary between the sub-areas may be prevented or hindered using the data related to the boundary together during the image processing.

The display device 1200 displays an image based on the output video data VD_OUT.

FIG. 18 is a block diagram illustrating an example of a display device included in an electronic system of FIG. 17.

Referring to FIG. 18, a display device 700 may include a display panel 710 and a display driver integrated (DDI) circuit. The DDI circuit may include a data driver 720, a scan driver 730, a power supply 740 and a timing controller 750.

The display panel 710 may operate (e.g., displays an image) based on video data VDAT. The display panel 710 may be connected to the data driver 720 through a plurality of data lines D1, D2, . . . , DM, and may be connected to the scan driver 730 through a plurality of scan lines S1, S2, . . . , SN. The plurality of data lines D1, D2, . . . , DM may extend in a first direction, and the plurality of scan lines S1, S2, . . . , SN may extend in a second direction crossing (e.g., substantially perpendicular to) the first direction.

The display panel 710 may include a plurality of pixels PX that are arranged in a matrix form having a plurality of rows and a plurality of columns. For example, each of (or alternatively, at least one of) the plurality of pixels PX may include a light emitting element and at least one transistor for driving the light emitting element. For another example, each of (or alternatively, at least one of) the plurality of pixels PX may include a liquid crystal capacitor and at least one transistor for driving the liquid crystal capacitor. Each of (or alternatively, at least one of) the plurality of pixels PX may be electrically connected to a respective one of the plurality of data lines D1, D2, . . . , DM and a respective one of the plurality of scan lines S1, S2, . . . , SN.

The timing controller 750 may control overall operations of the display device 700. For example, the timing controller 750 may provide predetermined (or alternatively, desired) control signals CS1, CS2 and CS3 to the data driver 720, the scan driver 730 and the power supply 740 based on a display control signal DCONT to control the operations of the display device 700. For example, the control signals CS1, CS2 and CS3 may include a vertical synchronization signal and a horizontal synchronization signal that are used inside the display device 700.

The timing controller 750 may generate a data signal DS for displaying an image based on the video data VDAT. For example, the video data VDAT may include red image data, green image data and blue image data. In addition, the video data VDAT may include white image data. Alternatively, the video data VDAT may include magenta image data, yellow image data, cyan image data, or the like.

The data driver 720 may generate a plurality of data voltages based on the control signal CS1 and the data signal DS, and may apply the plurality of data voltages to the display panel 710 through the plurality of data lines D1, D2, . . . , DM. For example, the data driver 720 may include a digital-to-analog converter (DAC) that converts the data signal DS in a digital form into the plurality of data voltages in an analog form.

The scan driver 730 may generate a plurality of scan signals based on the control signal CS2, and may apply the plurality of scan signals to the display panel 710 through the plurality of scan lines S1, S2, . . . , SN. The plurality of scan lines S1, S2, . . . , SN may be sequentially activated based on the plurality of scan signals.

In some example embodiments, the data driver 720, the scan driver 730 and the timing controller 750 may be implemented as one integrated circuit. In other example embodiments, the data driver 720, the scan driver 730 and the timing controller 750 may be implemented as two or more integrated circuits. A driving module including at least the timing controller 750 and the data driver 720 may be referred to as a timing controller embedded data driver (TED).

The power supply 740 may supply at least one power supply voltage PWR to the display panel 710 based on the control signal CS3.

In some example embodiments, at least some of the elements included in the display driver integrated circuit may be disposed, e.g., directly mounted, on the display panel 710, or may be connected to the display panel 710 in a tape carrier package (TCP) type. Alternatively, at least some of the elements included in the display driver integrated circuit may be integrated on the display panel 710. In some example embodiments, the elements included in the display driver integrated circuit may be respectively implemented with separate circuits/modules/chips. In other example embodiments, on the basis of a function, some of the elements included in the display driver integrated circuit may be combined into one circuit/module/chip, or may be further separated into a plurality of circuits/modules/chips.

Although not illustrated in detail, the display device 700 may further include a frame buffer for storing frame data, a backlight unit, etc. depending on a type of the pixels PX, a driving scheme of the display panel 710, etc.

FIG. 19 is a block diagram illustrating an electronic system according to some example embodiments. The descriptions repeated with FIG. 17 are omitted for brevity.

Referring to FIG. 19, an electronic system 1000a includes an image processing device 1100 and a display device 1200. The electronic system 1000a may further include a memory 1300.

The electronic system 1000a of FIG. 19 may be substantially the same as the electronic system 1000 of FIG. 17, except that the electronic system 1000a further includes the memory 1300.

The memory 1300 may temporarily store the output video data VD_OUT generated by the image processing device 1100, and may provide display output video data VD_DISP corresponding to the output video data VD_OUT to the display device 1200. For example, the memory 1300 may operate as a frame buffer. For example, the memory 1300 may include a DRAM.

FIG. 20 is a diagram for describing an operation of an electronic system of FIG. 19.

Referring to FIG. 20, an example of input images VIMG_INc corresponding to the input video data VD_IN is illustrated, an example of output images VIMG_OUTc corresponding to the output video data VD_OUT is illustrated, and an example of display output images VIMG_DISPc corresponding to the display output video data VD_DISP is illustrated.

For example, similar to that described with reference to FIG. 8C, the input images VIMG_INc may be received with the first frame rate, and the output images VIMG_OUTc provided from the image processing device 1100 to the memory 1300 may be output with the second frame rate. In addition, the display output images VIMG_DISPc provided from the memory 1300 to the display device 1200 may be output with the first frame rate.

As described with reference to FIGS. 8A, 8B and 8C, even when the images received with a relatively high frame rate are processed with a relatively low processing rate, the processed images may be displayed with a frame rate the same as the received frame rate while displaying on the display device. For example, as illustrated in FIGS. 19 and 20, the images processed with a relatively low processing rate may be displayed with a relatively high frame rate using the memory 1300. Accordingly, the image processing may be efficiently performed using the existing device and without increasing the cost, and the performance of displaying image may be maintained without degradation or deterioration.

FIG. 21 is a block diagram illustrating an electronic system according to some example embodiments.

Referring to FIG. 21, an electronic system 2000 may include a system-on-chip (SOC) 2100, a memory device 2130, a display device 2152, a touch panel 2154, a storage device 2170, a power management integrated circuit (PMIC) 2200, etc. The system-on-chip 2100 may include a processor 2110, an image processing device (IPD) 2115, a memory controller 2120, a performance controller (PFMC) 2140, a user interface (UI) controller 2150, a storage interface 2160, one or more intellectual properties (IP) 2180, a direct memory access device (DMA IP) 2185 having a function (or alternatively, a configuration) of direct memory access (DMA), a power management unit (PMU) 2144, a clock management unit (CMU) 2146, etc. It will be understood that components of the electronic system 2000 are not limited to the components illustrated in FIG. 21. For example, the electronic system 2000 may further include a hardware codec for processing image data, a security block, and/or the like.

The processor 2110 may execute software (for example, an application program, an operating system (OS), and device drivers) for the electronic system 2000. The processor 2110 may execute the operating system which may be loaded into the memory device 2130. The processor 2110 may execute various application programs to be driven on the operating system. The processor 2110 may be provided as a homogeneous multi-core processor or a heterogeneous multi-core processor. A multi-core processor is a computing component including at least two independently drivable processors (hereinafter referred to as "cores" or "processor cores"). Each of (or alternatively, at least one of) the cores may independently read and execute program instructions.

The memory controller 2120 may provide interfacing between the memory device 2130 and the system-on-chip 2100. The memory controller 2120 may access the memory device 2130 according to a request from the processor 2110, the intellectual property 2180 and/or the direct memory access device 2185. For example, the memory device 2130 may be implemented as a DRAM, and then the memory controller 2120 may be referred to as a DRAM controller.

An operating system or basic application programs may be loaded into the memory device 2130 during a booting operation. The performance controller 2140 may adjust operation parameters of the system-on-chip 2100 according to a control request provided from a kernel of the operating system. For example, the performance controller 2140 may adjust a level of dynamic voltage and frequency scaling (DVFS) to enhance the performance of the system-on-chip 2100.

The user interface controller 2150 may control user input and output from user interface devices. For example, the user interface controller 2150 may display a keyboard screen for inputting data to the display device 2152 according to a control of the processor 2110. Alternatively, the user interface controller 2150 may control the display device 2152 to display data requested by a user. The user interface controller 2150 may decode data provided from user input means, such as the touch panel 2154, into user input data.

The storage interface 2160 may access the storage device 2170 according to a request from the processor 2110. For example, the storage interface 2160 may provide interfacing between the system-on-chip 2100 and the storage device 2170. For example, data processed by the processor 2110 may be stored in the storage device 2170 through the storage interface 2160. Alternatively, data stored in the storage device 2170 may be provided to the processor 2110 through the storage interface 2160.

The storage device 2170 may be provided as a storage medium of the electronic system 2000. The storage device 2170 may store application programs, an operating system image, and various types of data. The storage device 2170 may be provided as a memory card (e.g., multimedia card (MMC), embedded MMC (eMMC), secure digital (SD), micro SD, etc.). The storage device 2170 may include a NAND-type flash memory with high-capacity storage capability. Alternatively, the storage device 2170 may include a next-generation nonvolatile memory such as phase change random access memory (PRAM), magnetic random access memory (MRAM), resistive random access memory (ReRAM), and ferroelectric random access memory (FRAM) or a NOR-type flash memory.

The direct memory access device 2185 may be provided as a separate intellectual property component to increase processing speed of a multimedia or multimedia data. For example, the direct memory access device 2185 may be provided as an intellectual property component to enhance processing performance of a text, audio, still images, animation, video, two-dimensional (2D) data or three-dimensional (3D) data.

A system interconnector 2190 may be a system bus to provide an on-chip network in the system-on-chip 2100. The system interconnector 2190 may include, for example, a data bus, an address bus and a control bus. The data bus may be a data transfer path. A memory access path to the memory device 2130 or the storage device 2170 may also be provided. The address bus may provide an address exchange path between intellectual properties. The control bus may provide a path along which a control signal is transmitted between intellectual properties. However, a configuration of the system interconnector 2190 is not limited to the above description, and the system interconnector 2190 may further include arbitration means for efficient management.

The image processing device 2115 may be the image processing device according to some example embodiments described with reference to FIGS. 1, 2A, 2B, 2C, 2D, 2E, 3, 4A, 4B, 4C, 5, 6A, 6B, 7, 8A, 8B, 8C, 9, 10, 11A, 11B, 11C, 12, 13, 14A, 14B, 14C, 14D, 14E, 15A, 15B, 15C, 15D and

15E. The input video may be split to correspond to the plurality of sub-areas, the independent image processing operations may be performed on the split videos, the output video may be generated by combining the image-processed videos, and thus high throughput may be achieved without increasing cost. In addition, the discontinuity at the boundary between the sub-areas may be prevented or hindered using the data related to the boundary together during the image processing.

FIG. 22 is a diagram illustrating a digital system according to some example embodiments.

Referring to FIG. 22, a digital system 3000 may include a plurality of source devices 3210, 3220, 3230, 3240 and 3250 that provide digital contents, and an electronic system 3100 that processes and displays the digital contents provided from the plurality of source devices 3210, 3220, 3230, 3240 and 3250. The digital system 3000 may further include a plurality of cables 3300 and a repeater 3400 that electrically connect the electronic system 3100 with the plurality of source devices 3210, 3220, 3230, 3240 and 3250.

The electronic system 3100 may be a receiver or receiving device that receives digital content data provided from the plurality of source devices 3210, 3220, 3230, 3240 and 3250 and displays images corresponding to the digital content data on a screen. The electronic system 3100 may be the electronic system according to some example embodiments described with reference to FIGS. 17, 18, 19 and 20. For example, the electronic system 3100 may be implemented as a digital TV.

The plurality of source devices 3210, 3220, 3230, 3240 and 3250 may be multimedia transmitters or transmitting devices that transmit the digital content data to the electronic system 3100 through the plurality of cables 3300. For example, the plurality of source devices 3210, 3220, 3230, 3240 and 3250 may be implemented as a camcorder, a digital camera, a Digital Versatile Disc (DVD) player, a Blu-ray Disc (BD) player, a PlayStation (PS), a set-top box, a mobile phone, a server providing video streaming services, etc. For example, the plurality of cables 3300 may be high definition multimedia interface (HDMI) cables.

The repeater 3400 may be disposed and/or installed between the plurality of source devices 3210, 3220, 3230, 3240 and 3250 and the electronic system 3100 to expand digital signal transmission.

Some example embodiments may be applied to various electronic devices and systems that include the image processing devices. For example, the some example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Any of the elements and/or functional blocks disclosed above may include or be implemented in processing circuitry such as hardware including logic circuits; a hardware/software combination such as a processor executing software; or a combination thereof. For example, the video splitter 200, video processors 300, video combiner 400, frame rate controller 1 320a, frame rate controller 2 320b, encoder 1 322a, encoder 2 332b, decoder 1 334a, and decoder 2 334b, filter1 340a, filter2 340b, timing controller 750, memory controller 2120, and UI controller 2150 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

The foregoing is illustrative of some example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image processing device comprising:
a memory configured to store instructions thereon; and
a processing circuitry configured to execute the instructions to cause the image processing device to
divide input video data into a plurality of input video sub-data including main input sub-data corresponding to respective sub-area among a plurality of sub-areas of the input video data, and boundary input sub-data corresponding to a portion of an adjacent sub-area adjacent to the respective sub-area among the plurality of sub-areas;
generate a plurality of output video sub-data by performing image processing operations on both the main input sub-data and the boundary input sub-data such that the plurality of output video sub-data includes main output sub-data corresponding to the main input sub-data, and boundary output sub-data corresponding to the boundary input sub-data; and
generate output video data corresponding to the input video data by merging the main output sub-data included in the plurality of output video sub-data without incorporating the boundary output sub-data into the output video data.

2. The image processing device of claim 1, wherein the processing circuitry is configured to further execute the instructions to cause the image processing device to perform a scaling operation on the input video data.

3. The image processing device of claim 2, wherein
the input video data has a first resolution, and
the output video data that is obtained by performing the scaling operation on the input video data has a second resolution different from the first resolution.

4. The image processing device of claim 2, wherein
the input video data has a first resolution, and
a portion of the input video data is obtained by performing a cropping operation on the input video data, and
the output video data that is obtained by performing the scaling operation on the portion of the input video data has the first resolution.

5. The image processing device of claim 1, wherein
the input video data is received with a first frame rate, and
the processing circuitry is further configured to execute the instructions to cause the image processing device to perform the image processing operations on the plurality of input video sub-data with a first data processing rate different from the first frame rate.

6. The image processing device of claim 5, wherein the output video data is output with a second frame rate that is different from the first frame rate and is equal to the first data processing rate.

7. The image processing device of claim 1, wherein the processing circuitry is further configured to execute the instructions to cause the image processing device to perform a frame rate controlling operation on the input video data.

8. The image processing device of claim 7,
wherein the input video data is received with a first frame rate, and
wherein the output video data that is obtained by performing the frame rate controlling operation on the input video data is output with a second frame rate different from the first frame rate.

9. The image processing device of claim 1, wherein the processing circuitry is further configured to execute the instructions to cause the image processing device to perform at least one of,
an encoding operation on the input video data; and
a decoding operation on the input video data.

10. The image processing device of claim 1, wherein the processing circuitry is further configured to execute the instructions to cause the image processing device to perform a filtering operation on the input video data.

11. The image processing device of claim 1, wherein
the memory is configured to receive the input video data from an external device and to store the input video data, and
the processing circuitry is further configured to execute the instructions to cause the image processing device to receive the input video data from the memory by performing a direct memory access (DMA) operation.

12. The image processing device of claim 1, wherein
the memory is configured to temporarily store at least one of the plurality of input video sub-data and the plurality of output video sub-data.

13. The image processing device of claim 1, wherein
the plurality of input video sub-data include first input video sub-data corresponding to a first sub-area, and second input video sub-data corresponding to a second sub-area,
the first input video sub-data includes first main input sub-data corresponding to the first sub-area, and first boundary input sub-data corresponding to a first portion of the second sub-area, and
the second input video sub-data includes second main input sub-data corresponding to the second sub-area, and second boundary input sub-data corresponding to a first portion of the first sub-area.

14. The image processing device of claim 13, wherein the plurality of input video sub-data further include third input video sub-data corresponding to a third sub-area, the third input video sub-data includes third main input sub-data corresponding to the third sub-area, and third boundary input sub-data corresponding to a second portion of the second sub-area, and the second input video sub-data further includes a fourth boundary input sub-data corresponding to a first portion of the third sub-area.

15. The image processing device of claim 14, wherein the first input video sub-data further includes fifth boundary input sub-data corresponding to a second portion of the third sub-area, and the third input video sub-data further includes sixth boundary input sub-data corresponding to a second portion of the first sub-area.

16. An electronic system comprising:

an image processing device configured to generate output video data based on input video data; and a display device configured to display an image based on the output video data, wherein the image processing device includes a memory configured to store instructions thereon; and a processing circuitry configured to execute the instructions to cause the image processing device to divide the input video data into main input sub-data corresponding to respective sub-area among a plurality of sub-areas of the input video data, and boundary input sub-data corresponding to a portion of an adjacent sub-area adjacent to the respective sub-area among the plurality of sub-areas, generate a plurality of output video sub-data by performing image processing operations on both the main input sub-data and the boundary input sub-data such that the plurality of output video sub-data includes main output sub-data corresponding to the main input sub-data, and boundary output sub-data corresponding to the boundary input sub-data, and generate the output video data by merging the main output sub-data included in the plurality of output video sub-data without incorporating the boundary output sub-data into the output video data.

17. The electronic system of claim 16, wherein the memory is configured to temporarily store the output video data.

18. An image processing device comprising:

a memory configured to receive input video data from an external device and to store the input video data and store instructions thereon; and processing circuitry configured to execute the instructions to cause the image processing device to receive the input video data from the memory by performing a direct memory access (DMA) operation, and to divide the input video data into first input video sub-data corresponding to a first sub-area of the input video data and second input video sub-data corresponding to a second sub-area of the input video data, generate first output video sub-data and second output video sub-data by independently performing scaling operations on the first input video sub-data and the second input video sub-data, respectively, and generate output video data corresponding to the input video data by merging the first output video sub-data and the second output video sub-data, wherein the first input video sub-data includes first main input sub-data corresponding to the first sub-area, and first boundary input sub-data corresponding to a portion of the second sub-area adjacent to the first sub-area, wherein the scaling operation on the first input video sub-data is performed on both the first main input sub-data and the first boundary input sub-data, wherein the second input video sub-data includes second main input sub-data corresponding to the second sub-area, and second boundary input sub-data corresponding to a portion of the first sub-area adjacent to the second sub-area, wherein the scaling operation on the second input video sub-data is performed on both the second main input sub-data and the second boundary input sub-data, wherein the first output video sub-data includes first main output sub-data corresponding to the first main input sub-data and first boundary output sub-data corresponding to the first boundary input sub-data, wherein the second output video sub-data includes second main output sub-data corresponding to the second main input sub-data and second boundary output sub-data corresponding to the second boundary input sub-data, and wherein the processing circuitry is further configured to execute the instruction to generate the output video data using the first main output sub-data and the second main output sub-data without using the first boundary output sub-data and the second boundary output sub-data.

* * * * *